US010852404B2

(12) United States Patent
Niwa

(10) Patent No.: US 10,852,404 B2
(45) Date of Patent: Dec. 1, 2020

(54) ULTRASONIC SENSOR, AND METHOD FOR CONTROLLING A BURST SIGNAL

(71) Applicant: Rohm Co., Ltd., Kyoto (JP)

(72) Inventor: Isao Niwa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 536 days.

(21) Appl. No.: 15/541,527

(22) PCT Filed: Dec. 4, 2015

(86) PCT No.: PCT/JP2015/084105
§ 371 (c)(1),
(2) Date: Jul. 5, 2017

(87) PCT Pub. No.: WO2016/111102
PCT Pub. Date: Jul. 14, 2016

(65) Prior Publication Data
US 2018/0003808 A1    Jan. 4, 2018

(30) Foreign Application Priority Data

Jan. 8, 2015 (JP) ................................. 2015-002558

(51) Int. Cl.
*G01S 7/524*    (2006.01)
*G01S 15/93*    (2020.01)
(Continued)

(52) U.S. Cl.
CPC .............. *G01S 7/524* (2013.01); *G01S 15/88* (2013.01); *G01S 15/93* (2013.01); *H02M 2001/0035* (2013.01)

(58) Field of Classification Search
CPC .......... G01S 7/524; G01S 15/88; G01S 15/93; H02M 2001/0035
See application file for complete search history.

(56) References Cited

U.S. PATENT DOCUMENTS 8,169,311 B1 *  5/2012  Breed ................. B60N 2/2806
                                                340/438
8,854,923 B1 * 10/2014  Eyster .................... H04R 17/00
                                                310/317
(Continued)

FOREIGN PATENT DOCUMENTS

DE    102008044366    6/2010
JP    S52-149145      12/1977
(Continued)

OTHER PUBLICATIONS

Japanese Patent Office, International Search Report for PCT/JP2015/084105 dated Mar. 8, 2016 with English translation.
(Continued)

*Primary Examiner* — Hovhannes Baghdasaryan
*Assistant Examiner* — Amie M Ndure
(74) *Attorney, Agent, or Firm* — Fish & Richardson P.C.

(57) ABSTRACT

An ultrasonic sensor 1000 has a transmission/reception processing circuit 100, and the transmission/reception processing circuit 100 has a burst signal transmission circuit 1 that generates and transmits burst signals S0, and a signal processing circuit 7 that processes reception signals received by a piezoelectric element 4. The signal processing circuit 7 verifies the reverberation frequency of the reverberation signals of ultrasonic signals (reception signals) reflected to the piezoelectric element 4 from a subject, and on the basis of the verified reverberation frequency and reverberation time of the reception signals, adjusts the frequency of the burst signals S0 to be substantially equal to the reverberation frequency, said burst signals being to be generated by the burst signal transmission circuit 1.

19 Claims, 9 Drawing Sheets

(51) Int. Cl.
    *G01S 15/88*      (2006.01)
    *H02M 1/00*      (2006.01)

(56) References Cited

U.S. PATENT DOCUMENTS

| | | | |
|---|---|---|---|
| 2001/0012238 A1* | 8/2001 | Iwasaki | G01S 7/527 367/99 |
| 2002/0023498 A1 | 2/2002 | Tsuzuki et al. | |
| 2006/0164919 A1 | 7/2006 | Watanabe et al. | |
| 2009/0260422 A1 | 10/2009 | Sugiura et al. | |
| 2010/0244623 A1* | 9/2010 | Huang | B06B 1/0207 310/300 |
| 2012/0174673 A1 | 7/2012 | Sugiura et al. | |
| 2015/0003205 A1 | 1/2015 | Urase | |

FOREIGN PATENT DOCUMENTS

| | | |
|---|---|---|
| JP | S63-087579 | 6/1988 |
| JP | H03-216578 | 9/1991 |
| JP | H09-184883 | 7/1997 |
| JP | H10-221433 | 8/1998 |
| JP | 2001-221849 | 8/2001 |
| JP | 2002-148347 | 5/2002 |
| JP | 2004-085473 A | 3/2004 |
| JP | 2006-208107 | 8/2006 |
| JP | 2009-267510 | 11/2009 |
| JP | 2013-156223 | 8/2013 |
| JP | 2014-160014 | 9/2014 |

OTHER PUBLICATIONS

Japanese Patent Office; Japanese Office Action mailed in corresponding Japanese Patent Application No. 2015-002558 (dated Dec. 18, 2018) with English-language translation.
European Patent Office, EESR for EP 15876975.2, dated Sep. 14, 2018.

\* cited by examiner

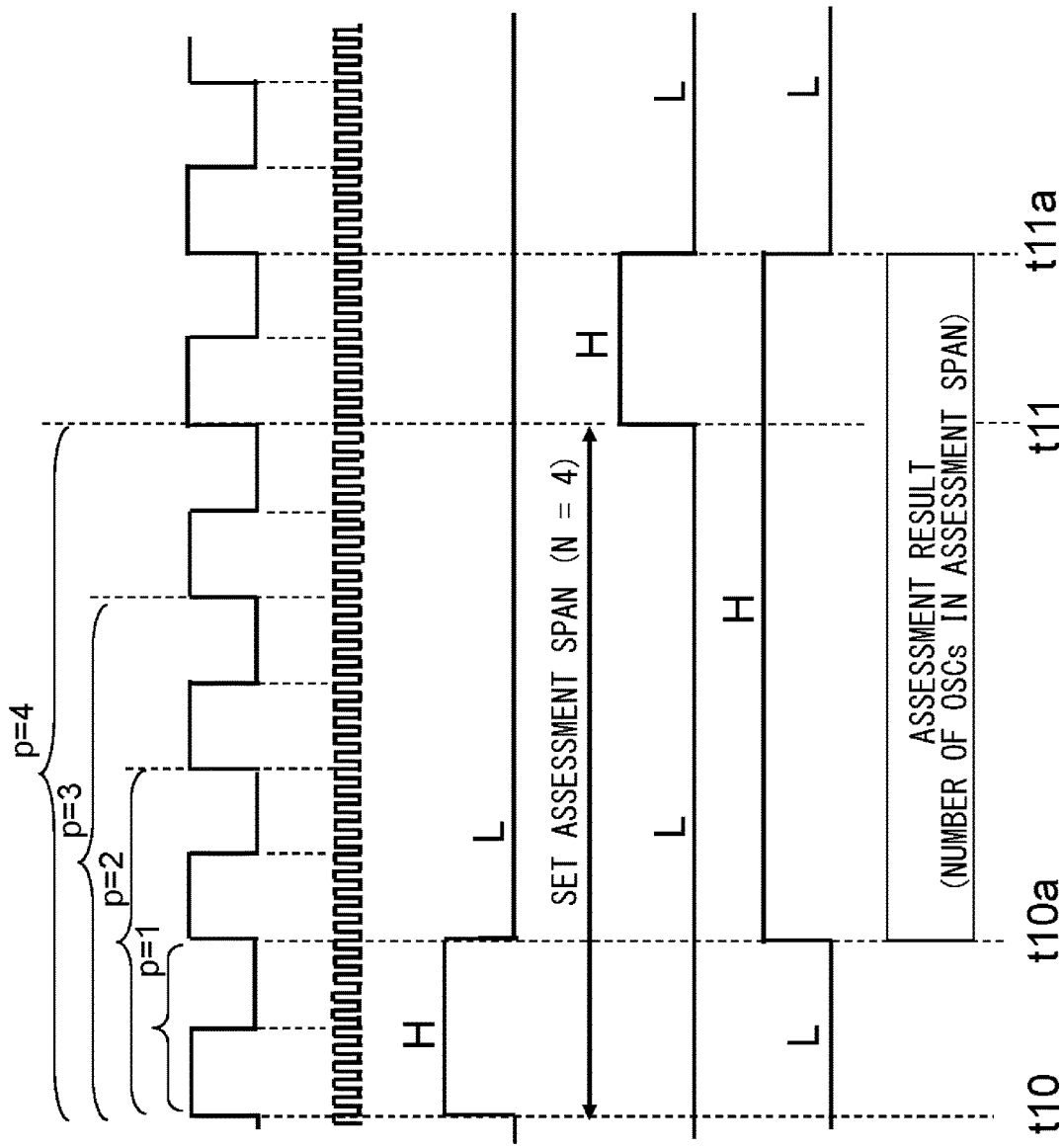

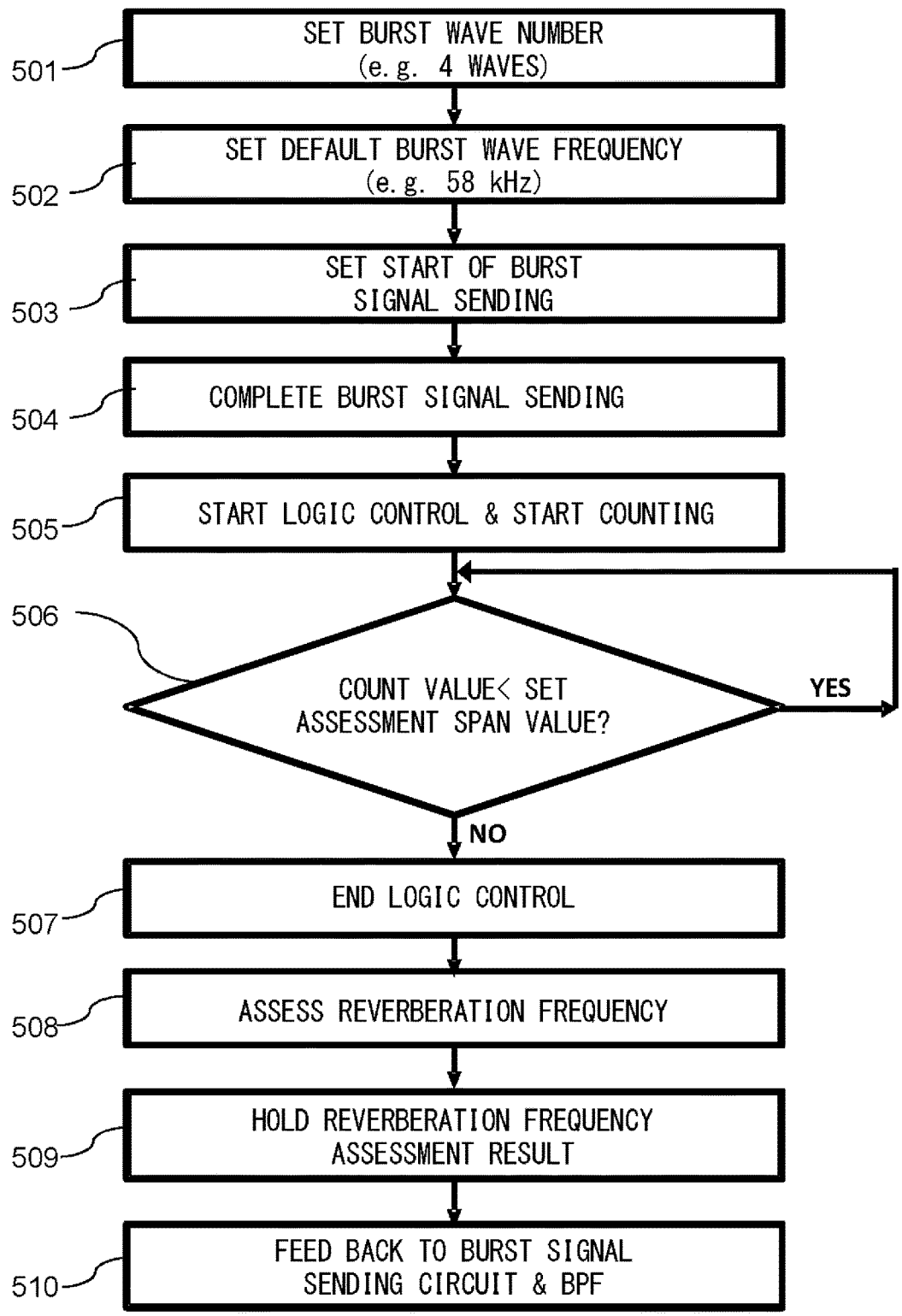

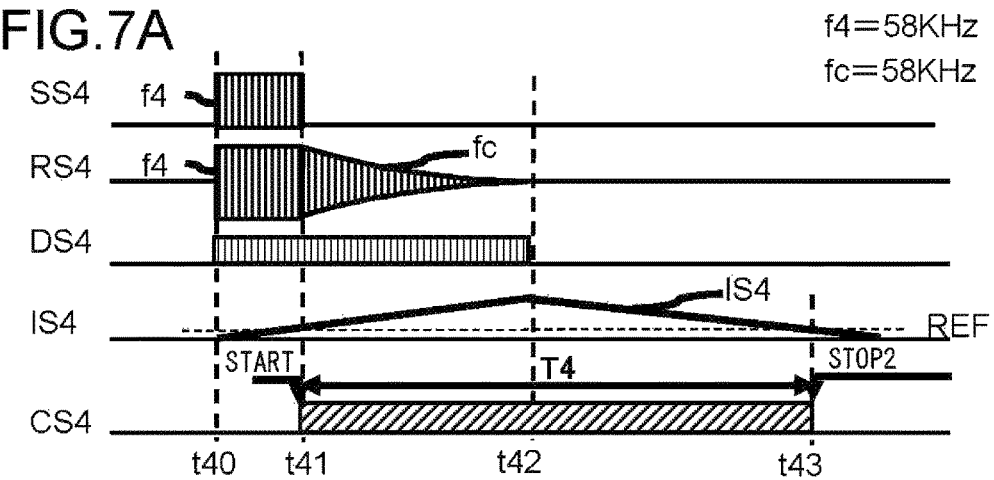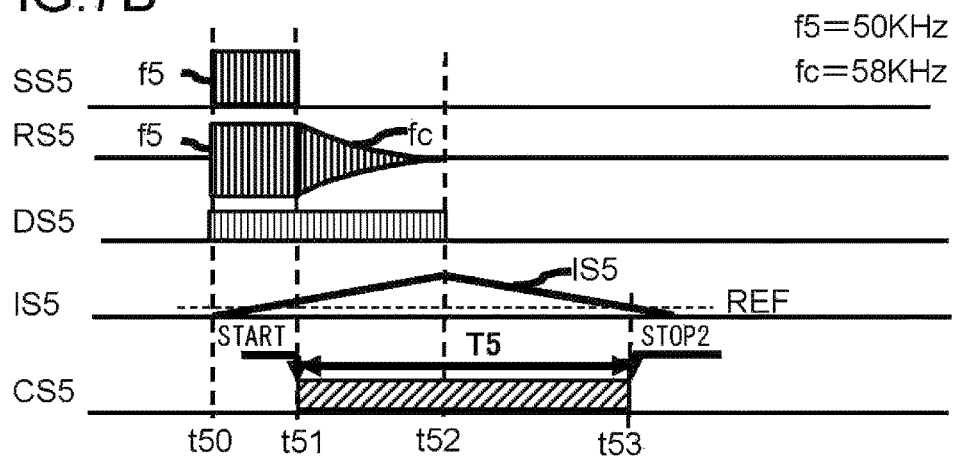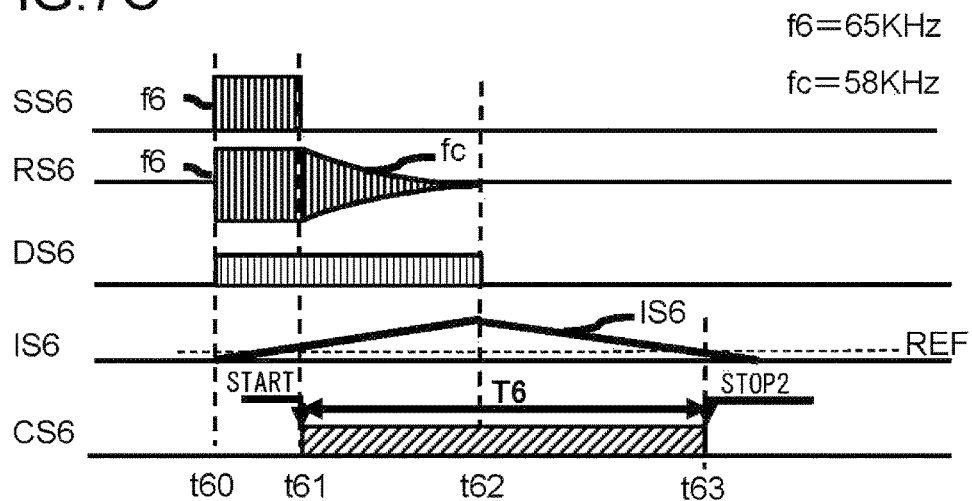

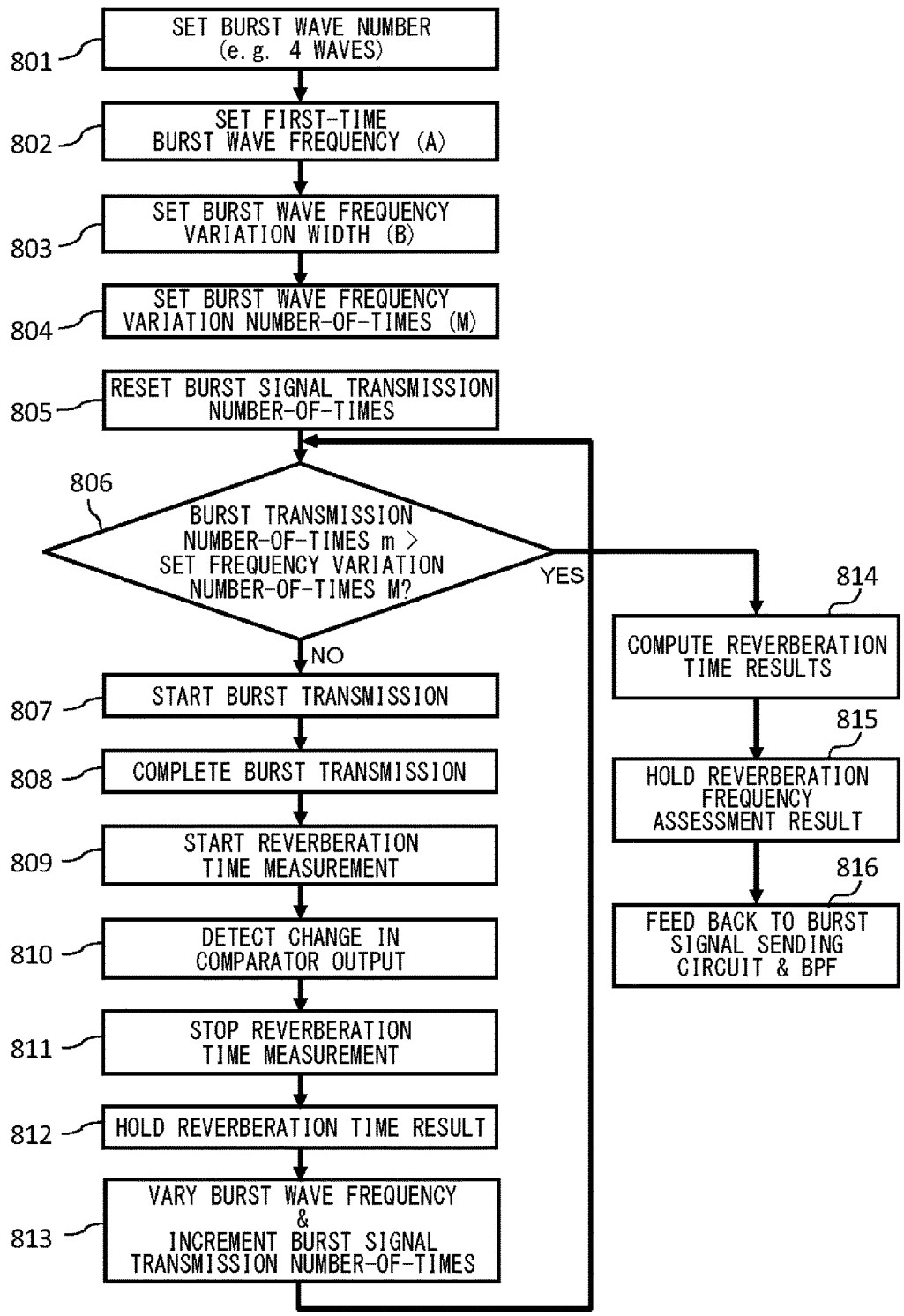

ULTRASONIC SENSOR, AND METHOD FOR CONTROLLING A BURST SIGNAL

TECHNICAL FIELD

The present invention relates to an ultrasonic sensor that transmits and receives ultrasonic waves, and to a method for controlling a burst signal. More particularly, the present invention relates to an ultrasonic sensor that detects the state, distance, and the like of an object based on a received ultrasonic signal, and to a method for controlling or adjusting a burst wave frequency, that is, the frequency of a burst signal used in an ultrasonic sensor.

BACKGROUND ART

Conventionally, for example, in an obstacle detection device for passenger vehicles that employs an ultrasonic sensor, the time that elapses after ultrasonic waves are sent until waves reflected from an object are received is used to determine the presence/absence of an obstacle within a detection range and to measure the distance to the obstacle. In such an obstacle detection device, waves are sent at a frequency equal to the proper vibration frequency of an piezoelectric element with a view to amplifying the sent ultrasonic vibration and thereby enhancing the transmission/reception sensitivity.

However, the proper vibration frequency of the piezoelectric element varies with change in the environment. Moreover, the transmission from the ultrasonic sensor has to be directed to an obstacle present around the vehicle, and the piezoelectric element is generally attached to the exterior wall of the vehicle; accordingly, the vibration surface of the piezoelectric element is exposed toward the surroundings of the vehicle. Thus, depending on change in the environment, the vibration surface tends to be soiled with, for example, mud, rain, snow, or the like. Mud, rain, or snow on the piezoelectric element can cause a change in its proper vibration frequency. The sending frequency may then deviate from the proper vibration frequency of the piezoelectric element, leading to a drop in transmission/reception sensitivity.

In general, after an ultrasonic sensor finishes sending ultrasonic waves, the vibration of an ultrasonic vibrator inside the piezoelectric element continues for a predetermined time. The time from the end of ultrasonic wave transmission to the termination of vibration is called the reverberation time. Here, the frequency of the reverberation signal equals the proper vibration frequency, that is, resonance frequency, of the piezoelectric element.

With regard to ultrasonic sensors, many proposals have been made. Patent Document 1 discloses a method according to which a resonance frequency is detected based on a reverberation frequency, and the frequency of an applied voltage is adjusted to be equal to the resonance frequency.

Patent Document 2 discloses a method according to which a plurality of different frequencies are generated and mixed together, and a frequency for transmission is selected based on the chief frequency difference of a received signal.

Patent Document 3 discloses a detection device which indicates a fault when snow attaches to the vibration surface of an ultrasonic sensor.

Patent Document 4 discloses a method directed to a piezoelectric element shared between reception and transmission according to which the number of waves in burst waves is varied with a view to enhancing wave reception sensitivity and suppress erroneous detection.

LIST OF CITATIONS

Patent Literature

Patent Document 1: JP published as No. 2009-267510
Patent Document 2: JP published as No. H9-184883
Patent Document 3: JP published as No. 2002-148347
Patent Document 4: JP published as No. 2013-156223

SUMMARY OF THE INVENTION

Technical Problem

However, Patent Document 1 mentioned above, though it suggests a technical idea of adjusting the frequency of the voltage applied to the piezoelectric element to the resonance frequency, does not disclose any specific circuit configuration to that end. Nor does it suggest adjusting the frequency of the applied voltage.

Patent Document 2 requires a reference ultrasonic wave receiver and involves a somewhat complex circuit configuration. Moreover, Patent Document 2, though it discloses providing a frequency generating means for generating a plurality of different frequencies and a frequency mixing means for mixing together the plurality of frequencies, does not disclose adjusting a frequency based on a reverberation frequency.

Patent Document 3 does not suggest or disclose any specific circuit configuration for suppressing, after detecting an ultrasonic sensor being soiled with, for example, snow, the effect of snow.

Patent Document 4 does not suggest a technical idea of suppressing a drop in wave reception sensitivity due to extraneous change.

In view of the problems discussed above, an object of the present invention is to provide an ultrasonic sensor that automatically corrects its proper vibration frequency due to extraneous change in the environment, such as mud, rain, snow, and temperature, and that can thereby suppress a drop in transmission/reception sensitivity ascribable to the extraneous change, and to provide a method of controlling and adjusting the frequency (burst wave frequency) of a burst signal that is applied to a piezoelectric element used in such an ultrasonic sensor.

Means for Solving the Problem

In the present description, "burst signal" denotes a whole signal sent from a burst signal sending circuit in which, for example, pulses, triangular waves, sine waves, or the like appear intermittently, inclusive of signal parts where those do not appear.

In the present description, "burst waves" denotes a part of a "burst signal" which is a signal itself composed of pulses, triangular waves, or sine waves.

In the present description, "burst wave frequency" denotes the frequency of a burst signal as defined above. "Burst wave frequency" is synonymous with "frequency of a burst signal" or "burst signal frequency".

In the present description, "ultrasonic sensor" means a sensor that transmits sound waves having a vibration frequency inaudible to the human ear, that is, ultrasonic waves, from a transmitter to an object and that then receives their reflection with a receiver to detect, for example, the presence/absence of an object and the distance to the object. Accordingly, an "ultrasonic sensor" includes not only, for example, a ceramic piezoelectric element for generating ultrasonic waves but also a transmitter, a receiver, and their peripheral circuits. In the present description, a mention of an "ultrasonic sensor" unaccompanied by a reference sign does not refer to a particular circuit or component but is intended to convey a broader concept including the just-mentioned functions.

In the present description, "ultrasonic signal" covers not only a burst signal as defined above but also a signal sent from a burst signal sending circuit and a reception signal reflected from an object; thus, the term denotes not only a "burst signal" and "burst waves" as defined above but any signal in general that is generated or processed in an ultrasonic sensor.

On the other hand, "reverberation signal" denotes an ultrasonic signal that occurs in or is output from a piezoelectric element even after a burst signal applied to it is cut and that has a frequency close to the reverberation frequency of the piezoelectric element. "Reverberation frequency" denotes the frequency of a reverberation signal as just defined.

In the present description, "assessment" denotes signal processing for detecting or measuring a reverberation signal as defined above, or a processed signal resulting from a reverberation signal being processed, according to predetermined criteria and then determining a reverberation frequency as defined above or the frequency or signal duration of the reverberation signal or the processed signal.

To achieve the above object, according to one aspect of the present invention, an ultrasonic sensor includes: a piezoelectric element for transmitting and receiving an ultrasonic signal; a transmitter configured to drive the piezoelectric element; a burst signal sending circuit configured to deliver a burst signal to the transmitter; a receiver configured to accept a reception signal received by the piezoelectric element; an amplification circuit configured to amplify the reception signal to output an amplified signal; and a signal processing circuit configured to assess the amplified signal output from the amplification circuit. The signal processing circuit is configured to assess the reverberation time or the reverberation frequency of a reverberation signal contained in the amplified signal and feed the result of assessment back to the burst signal sending circuit. Based on the result of assessment, the burst signal sending circuit adjusts the burst wave frequency, that is, the frequency of the burst signal.

According to another aspect of the present invention, the burst signal sending circuit is configured to adjust the burst wave frequency to the reverberation frequency.

According to another aspect of the present invention, the integral time of an integral signal obtained by integrating the amplified signal is measured, and the burst wave frequency is adjusted based on the integral time.

According to another aspect of the present invention, the signal processing circuit is configured to assess the reverberation frequency by counting the number of pulse signals occurring within predetermined periods of the reverberation signal.

According to another aspect of the present invention, the signal processing circuit is configured to convert an analog amplified signal extracted from the output of the amplification circuit into a digital signal with an A/D converter, filter the digital signal through a band-pass filter, and use an integral signal obtained by integrating the filtered signal for assessment of the burst wave frequency.

According to another aspect of the present invention, while the burst wave frequency is varied in a predetermined range, the number of pulse signals is sequentially counted and stored in a memory, and the frequency of the burst signal generated by the burst signal sending circuit is adjusted to the burst wave frequency that exhibits the largest number of pulse signals among those stored in the memory.

According to another aspect of the present invention, an ultrasonic signal occurring at one terminal of the piezoelectric element is applied constantly to the amplification circuit via the receiver.

According to another aspect of the present invention, a low-pass filter is coupled to the input terminal of the receiver, and through the low-pass filter, the output terminal of the transmitter and one terminal of the piezoelectric element are coupled to the input terminal of the amplification circuit.

According to another aspect of the present invention, between the transmitter and the burst signal sending circuit, there is provided a driver circuit that is configured to amplify the burst signal and drive the transmitter.

According to another aspect of the present invention, the driver circuit or the transmitter includes a transformer for amplifying the burst signal.

According to yet another aspect of the present invention, a method for controlling a burst wave frequency includes the following steps:

(a1) a step (501) of setting the number of burst waves constituting a burst signal generated by a burst signal sending circuit;

(b1) a step (502) of setting the initial frequency of the burst waves;

(c1) a step (503, 504) of starting and then ending application of the burst signal to a piezoelectric element;

(d1) a step (505) of starting the circuit operation of a logic controller, which is part of the signal processing circuit, to start assessment of the reverberation frequency;

(e1) a step (506) of comparing the count value of periods of the burst signal with an assessment span set value;

(f1) a step (507) of ending the circuit operation of the logic controller when the count value reaches the assessment span set value;

(g1) a step (508) of assessing the reverberation frequency in the signal processing circuit; and (h1) a step (510) of feeding the result of assessment of the reverberation frequency back to the burst signal sending circuit and adjusting the burst wave frequency.

According to still another aspect of the present invention, a method for controlling a burst wave frequency includes the following steps:

(a2) a step (801) of setting the number of burst waves constituting a burst signal generated by a burst signal sending circuit;

(b2) a first-time burst wave frequency setting step (802) of setting the first-time frequency of the burst waves;

(c2) a step (803) of setting the variation width of the burst wave frequency;

(d2) a step (804) of setting the variation number-of-times of the burst wave frequency;

(e2) a burst signal transmission number-of-times resetting step (805) of resetting the number of times of application of the burst signal to a piezoelectric element; and (f2) a step (806) of comparing the burst signal transmission number-of-times with the set burst wave frequency variation number-of-times;

(g2) a step (807) of transmitting the burst signal until the burst signal transmission number-of-times reaches the burst wave frequency variation number-of-times;

(h2) a burst signal transmission completing step (808) of ending transmission of the burst signal;

(i2) a step (809) of measuring the time for which an ultrasonic signal reflected from the object reverberates;

(j2) a step (810) of comparing the reverberation time with a predetermined value in an assessor and a step (811) of stopping measurement of the reverberation time when the reverberation time reaches the predetermined value;

(k2) a step (812) of holding the measured reverberation time and a step (813) of adjusting the burst wave frequency according to the held reverberation time.

are performed repeatedly.

Advantageous Effects of the Invention

According to the present invention, it is possible to automatically adjust the frequency of a burst signal according to change in the environment where an ultrasonic sensor is placed, thereby to suppress a drop in the transmission/reception sensitivity of the ultrasonic sensor ascribable to extraneous change.

BRIEF DESCRIPTION OF DRAWINGS

FIG. 4 is a timing chart of principal signals in the first embodiment of the present invention;

FIG. 5 is a flow chart showing a method for adjusting a burst wave frequency in the first embodiment of the present invention;

FIG. 7A is a timing chart illustrating FIG. 6 (f4=fc);

FIG. 7B is a timing chart illustrating FIG. 6 (f5<fc);

FIG. 7C is a timing chart illustrating FIG. 6 (f6>fc);

FIG. 8 is a flow chart illustrating FIG. 6; and

DESCRIPTION OF EMBODIMENTS

Figure 1:
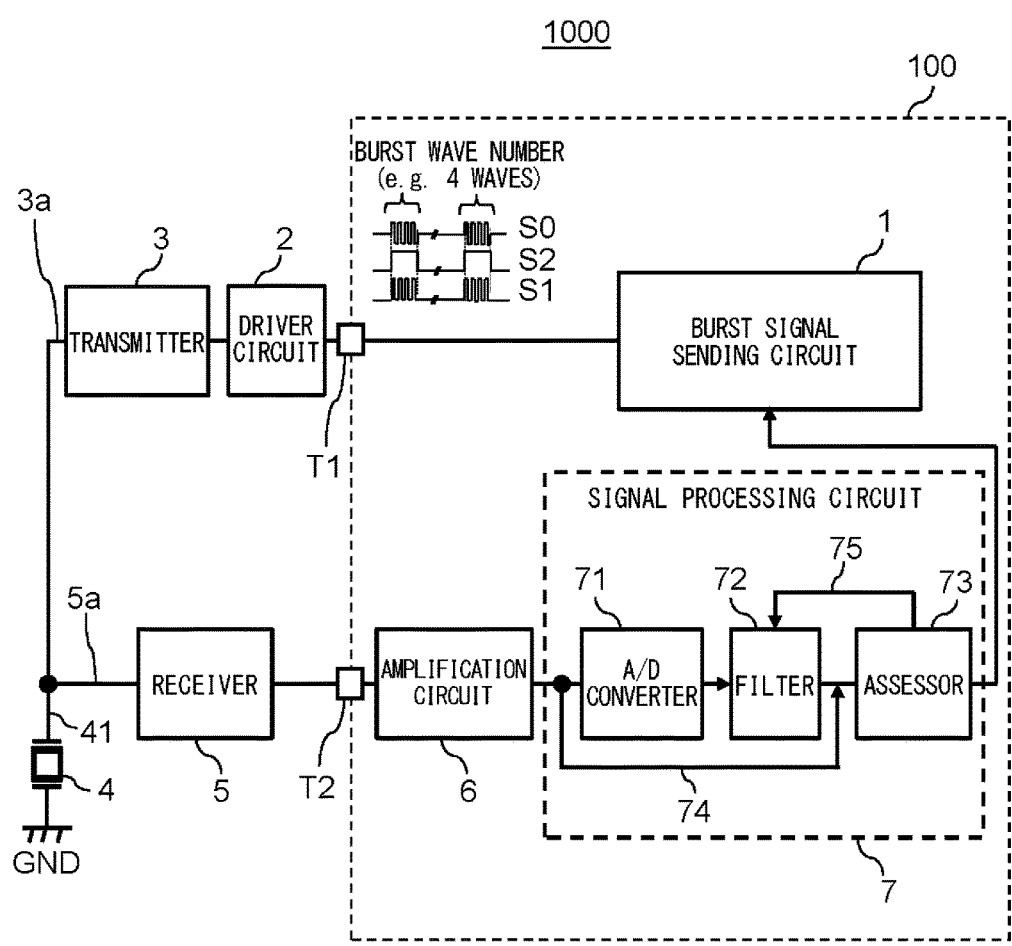
FIG. 1 is an outline circuit block diagram of an ultrasonic sensor according to the present invention.

FIG. 1 is a circuit block diagram showing an outline of an ultrasonic sensor according to the present invention. An ultrasonic sensor according to the present invention is used, for example, as a corner sonar device or a back sonar device provided in a corner part of a bumper of an automobile. The ultrasonic sensor 1000 includes a transmission/reception processing circuit 100, a driver circuit 2, a transmitter 3, a piezoelectric element 4, and a receiver 5. The transmitter 3, the piezoelectric element 4, and the receiver 5 correspond to a transmitter-receiver in the present description.

The transmission/reception processing circuit 100 includes a burst signal sending circuit 1, an amplification circuit 6, a signal processing circuit 7, a sending terminal T1, and a reception terminal T2. A burst signal S0 sent from the burst signal sending circuit 1 is fed to the driver circuit 2 via the sending terminal T1, and a reception signal (ultrasonic signal) is applied to the reception terminal T2 via the piezoelectric element 4 and the receiver 5. The reception signal contains an ultrasonic signal component of the burst signal S0 transmitted from the transmitter 3.

The burst signal sending circuit 1 generates the burst signal S0, and transmits it to the driver circuit 2 via the sending terminal T1. The burst signal S0 is generated based on a carrier wave S1 and a modulation wave S2. That is, the burst signal S0 is an ultrasonic signal that occurs intermittently as the carrier wave S1 being cut apart at the intervals of the modulation wave S2. The burst signal S0 has, for example, four voltage peaks, that is, four "waves". This is described: the number of burst waves is four. The burst signal sending circuit 1 adjusts the frequency of the burst signal S0 based on a reverberation frequency detection result from a detector 73. The carrier wave S1 is a so-called ultrasonic wave, and has a high oscillation frequency of, for example, 20 kHz or higher that is inaudible to the human ear. The carrier wave S1 used in the present invention has a frequency of, for example, 40 kHz to 80 kHz. The modulation wave S2 is a signal that modulates the carrier wave S1, and has a frequency of, for example, several tens of hertz, which is thus about two orders of magnitude lower than the frequency of the carrier wave S1. In the following description, "burst waves" refers to a signal component of the carrier wave S1 that constitutes part of the burst signal S0. On the other hand, "burst wave frequency" corresponds to the frequency of the carrier wave S1.

The driver circuit 2 receives the burst signal S0 from the burst signal sending circuit 1, and feeds it to the transmitter 3. The driver circuit 2 amplifies the burst signal S0 up to a level sufficient to drive the transmitter 3.

The transmitter 3 receives the burst signal S0 sent from the burst signal sending circuit 1 via the driver circuit 2, and applies it to the piezoelectric element 4. The transmitter 3 includes, for example, a transformer as an amplifying means for sufficient driving and oscillation of the piezoelectric element 4, and raises the burst signal S0 to a sufficient level. The raised level is, for example, 80 Vpp. Adopting a transformer permits a comparatively large burst signal (ultrasonic signal) to be outputted from the transmitter 3 even when the supply voltage VDD fed to the driver circuit 2 and the transmitter 3 is comparatively low. The driver circuit 2 and the transmitter 3 do not necessarily have to be distinguished from each other; the two may be integrated together and be configured as a single transmitter. The output terminal 3a of the transmitter 3 is coupled to one terminal 41 of the piezoelectric element 4 and to the input terminal 5a of the receiver 5.

The piezoelectric element 4 receives the signal sent from the transmitter 3, and based on it transmits an ultrasonic signal to an unillustrated object or obstacle. The piezoelectric element 4 also serves to receive a reception signal, that is, the ultrasonic signal reflected from the unillustrated object or obstacle. While the burst signal S0 is being applied to the piezoelectric element 4, an ultrasonic vibrator in the piezoelectric element 4 keeps vibrating; after the application of the burst signal S0 is cut, a reverberation signal occurs. The transmitted ultrasonic signal is reflected from the obstacle, and the ultrasonic vibrator in the piezoelectric element 4 receives the reflected waves to vibrate; thus, the piezoelectric element 4 converts the reflected waves into an ultrasonic signal based on them and outputs it. The piezoelectric element 4 is shared between transmission and reception of the ultrasonic wave. One terminal of the piezoelectric element 4 is coupled to both the output terminal of the transmitter 3 and the input terminal of the receiver 5. Although in the present invention the piezoelectric element 4 is shared between the transmitter 3 and the receiver 5, the transmitter 3 and the receiver 5 may each be provided with a separate piezoelectric element. One terminal of the piezoelectric element 4 is coupled to the output terminal 3a of the transmitter 3 and to the input terminal 5a of the receiver 5, and the other terminal of the piezoelectric element 4 is connected to the ground potential GND.

The receiver 5 receives the ultrasonic signal converted into the vibration of the ultrasonic vibrator, and delivers it to the amplification circuit 6, which constitutes part of the transmission/reception processing circuit 100. In the present invention, the receiver 5 also has the function of cutting a direct-current signal component while greatly attenuating a high-frequency signal component. The input terminal 5a of the receiver 5 is coupled to the output terminal 3a of the transmitter 3 and to one terminal 41 of the piezoelectric element 4. With this circuit configuration, the receiver 5 can, even when there is change in the electrical characteristics of the transmitter 3 and the piezoelectric element 4, deliver the ultrasonic signal determined by the entire transmitter-receiver to the circuit in the succeeding stage. It is thus possible to perform reverberation frequency assessment reliably while coping with change in the use environment of the ultrasonic sensor.

The amplification circuit 6 amplifies the ultrasonic signal input from the receiver 5, and transmits the result to the signal processing circuit 7. The voltage amplification factor of the amplification circuit 6 is set appropriately in a range of, for example, 20 dB to 100 dB based on the level of the reception signal.

The signal processing circuit 7 includes an A/D converter 71 which converts the analog signal amplified by the amplification circuit 6 into a digital signal, a filter 72 which applies digital filtering to the converted digital signal, and an assessor 73 which assesses the converted digital signal. The signal processing circuit 7 assesses the reverberation frequency of the ultrasonic signal in the assessor 73, and feeds the assessed reverberation frequency back to the burst signal sending circuit 1 and the filter 72. Based on the assessed reverberation frequency, the filtering band frequency in the filter 72 is determined; also, the frequency of the burst signal S0 sent from the burst signal sending circuit 1, that is, the burst wave frequency, is adjusted. In a case where the ultrasonic signal received in the receiver 5 is subjected to analog processing in the signal processing circuit 7, the A/D converter 71 and the filter 72 are unnecessary. A signal line 74 illustrates the signal path used in a case where the A/D converter 71 and the filter 72 are not adopted. In that case, the ultrasonic signal is fed directly from the amplification circuit 6 to the assessor 73. In that case, needless to say, the feedback path illustrated by a signal line 75 for feedback from the assessor 73 to the filter 72 also is unnecessary.

The ultrasonic sensor 1000 shown in FIG. 1 can be summarized as follows: The burst wave frequency of the burst signal S0 that is set and that is sent from the burst signal sending circuit 1 is re-adjusted based on the frequency of the reverberation signal contained in the ultrasonic signal that returns from the piezoelectric element 4 via the receiver 5.

First Embodiment

Figure 2:
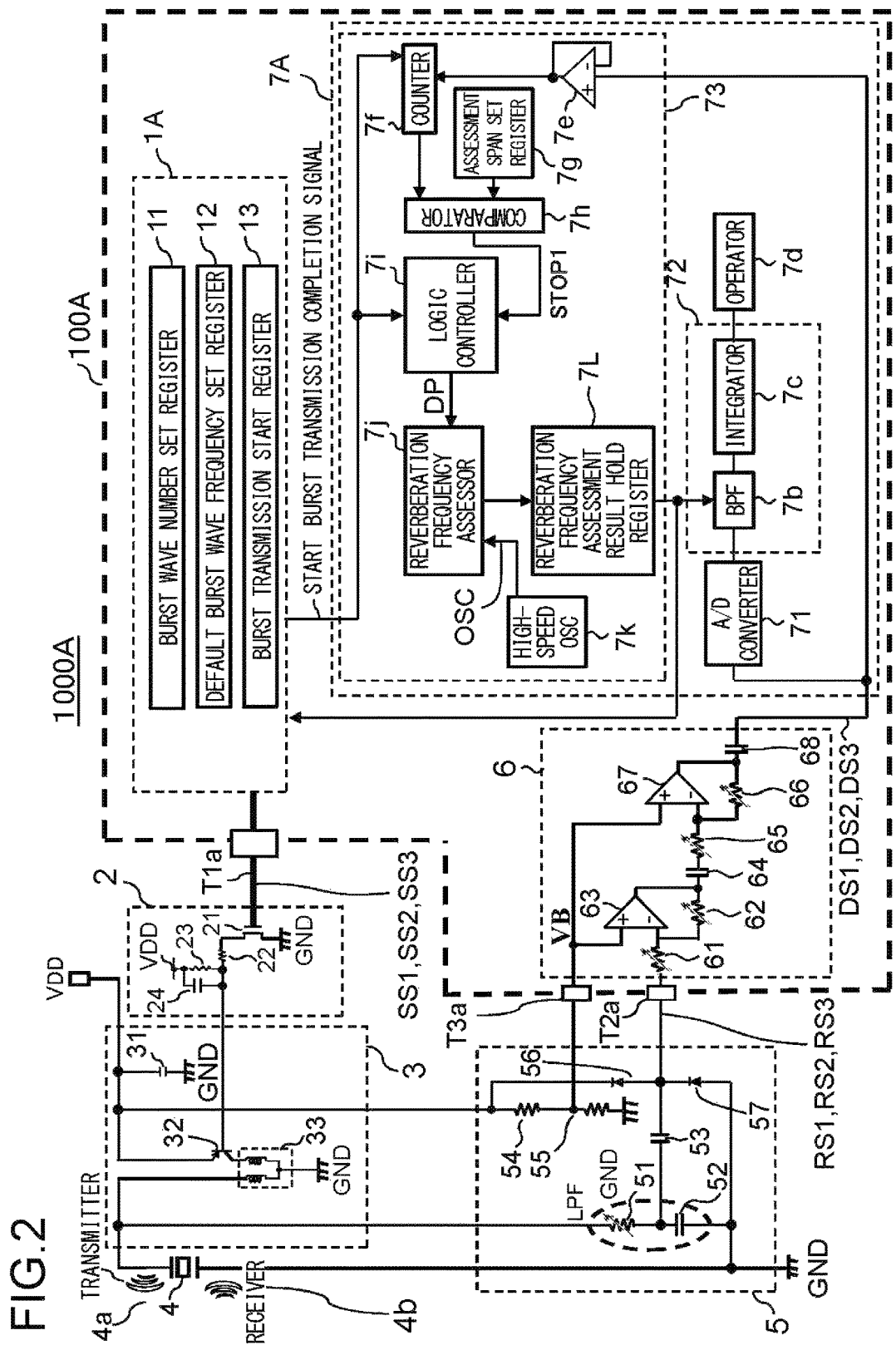
FIG. 2 shows a first embodiment of the present invention, and is a specific circuit configuration diagram of FIG. 1.

FIG. 2 is a specific circuit configuration diagram of the circuit block diagram shown in FIG. 1, and shows a first embodiment of the present invention. An ultrasonic sensor 1000 according to the first embodiment, largely like the one shown in FIG. 1, includes a transmission/reception processing circuit 100A, a driver circuit 2, a transmitter 3, a piezoelectric element 4, and a receiver 5. The transmission/reception processing circuit 100A includes a sending terminal T1a, a reception terminal T2a, and a bias terminal T3a. The ultrasonic sensor 1000 according to the first embodiment is mounted, for example, on the body of an automobile (unillustrated), and is used to detect the presence/absence of an object or obstacle around the vehicle and to measure the distance to the obstacle. Ultrasonic sensors according to the present invention find applications not only in vehicles themselves but also in a large variety of object detection devices and sensors, such as in parking management systems, humidity sensors, snow depth meters, object detection for belt conveyors, liquid level detection during the filling of tanks, human presence sensors for automatic doors and for surveillance against trespassing, and measurement of various kinds of displacement.

A burst signal sending circuit 1A includes a burst wave number set register 11, a default burst wave frequency set register 12, and a burst transmission start register 13. As mentioned previously, the burst signal sending circuit 1 adjusts the frequency of the burst signal S0 sequentially based on the reverberation frequency assessed in the signal processing circuit 7. Moreover, when the burst signal sending circuit 1 completes sending, it transmits a burst transmission completion signal START to the signal processing circuit 7. Here, the default burst wave frequency set register 12 is referred to also as a burst signal frequency set register 12.

The driver circuit 2 includes a transistor 21, resistors 22 and 23, a capacitor 24, and a supply voltage VDD. The driver circuit 2 serves to amplify an ultrasonic signal to a level sufficient for transmission from the transmitter 3 in the succeeding stage to the piezoelectric element 4. The transistor 21 drives a transistor 32 in the succeeding stage, the resistor 22 limits the base current of the transistor 32, and the resistor 23 and the capacitor 24 constitute a smoothing circuit to suppress unnecessary signal components.

The transmitter 3 includes a capacitor 31, a transistor 32, and a transformer 33. The output signal of the driver circuit 2 is raised by the transformer 33, and the piezoelectric element 4 is vibrated. The transistor 32 feeds the burst signal S0 to the primary winding of the transformer 33. The transistor 32 is, for example, a bipolar PNP transistor. The emitter of the transistor 32 is connected to the supply voltage VDD, and on its collector side, that is, on the primary side of the transformer 33, a current of, for example, about 100 mA is present. On the secondary side of the transformer 33, there appears an ultrasonic signal of which the level depends on the numbers of turns in the primary and secondary windings. The capacitor 31 smooths ripples in the supply voltage VDD, and thus acts as a so-called bypass capacitor.

The piezoelectric element 4 includes an unillustrated ultrasonic vibrator. In the first embodiment, the piezoelectric element 4 bidirectionally converts between the ultrasonic signal and the vibration of the ultrasonic vibrator by use of an piezoelectric element that is formed of a material such as lead zirconate titanate (PZT), lanthanum-doped lead zirconate titanate (PLZT), polyvinylidene fluoride, or the like. As mentioned previously, the piezoelectric element 4 may be shared between transmission 4a and reception 5b of the ultrasonic signal, or separate piezoelectric elements may be used for transmission 4a and reception 5b respectively.

The receiver 5 includes a variable resistor 51, capacitors 52 and 53, resistors 54 and 55, and diodes 56 and 57. The variable resistor 51 and the capacitor 52 constitute a low-pass filter (LPF). The low-pass filter LPF is arranged on the input terminal side of the receiver 5, and the input of the low-pass filter LPF is coupled to one terminal of the transmitter 3 and to one terminal of the piezoelectric element 4. The output of the low-pass filter LPF is coupled via the capacitor 52 to an amplification circuit 6 in the succeeding stage. The time constant of the low-pass filter LPF is controlled, for example, by adjusting the resistance value of the resistor 54. Providing the low-pass filter LPF helps avoid direct coupling between, at one end, the receiver 5 and, at the other end, the piezoelectric element 4 and the transmitter 3; that is, it helps avoid interference between, at one end, the receiver 5 and, at the other end, the piezoelectric element 4 and the transmitter 3. The low-pass filter LPF is not essential. The capacitor 53 cuts a direct-current component. The electrical signal from the piezoelectric element 4 is fed to the amplification circuit 6 via the receiver 5. The resistors 54 and 55 serve to determine the circuit operation point of the amplification circuit 6 in the succeeding stage, and thus act as a so-called bias resistor. The diodes 56 and 57 prevent the transmission/reception processing circuit 100A from malfunctioning or deteriorating due to an unwanted surge voltage, noise, or the like that may reach the reception terminal T2a, and is thus provided for protection against so-called electrostatic destruction (ESD).

The amplification circuit 6 includes variable resistors 61, 62, 65, and 66, amplifiers 63 and 67, and capacitors 64 and 68. The voltage amplification factor of the amplification circuit 6 is determined based on the level of the reception signal output from the receiver 5. Used as the amplification circuit 6 is, for example, a PGA (programmable-gain amplifier) of which the voltage amplification factor is variable. The voltage amplification factor of the amplification circuit 6 as a whole is set at, for example, 20 dB to 100 dB. The voltage amplification factor of the amplification circuit 6 is controlled, for example, by digitally controlling the resistance values of the resistors 61, 62, 65, and 66. The capacitors 64 and 68 serve to prevent a direct-current component from being delivered to the succeeding stage, and are thus provided for so-called direct-current cutting. To the non-inverting input terminals (+) of the amplifiers 63 and 67, a bias voltage VB set by the resistors 54 and 55 is fed. The bias voltage VB is set at a level that gives the amplifiers 63 and 67 optimal dynamic ranges. The level of the bias voltage VB is set at, for example, VB=VDD/2, assuming that the amplifiers 63 and 67 are fed with the supply voltage VDD.

The signal processing circuit 7 includes an A/D converter 71, a filter 72, an operator 7d, and an assessor 73. The filter 72 includes a band-pass filter (BPF) 7b and an integrator 7c. The assessor 73 includes an amplifier (buffer) 7e, a counter 7f, an assessment span set register 7g, a comparator 7h, a logic controller 7i, a reverberation frequency assessor 7j, a high-speed OSC 7k, and a reverberation frequency assessment result hold register 7L. The circuit operation of the signal processing circuit 7 will be described later.

When amplified signals DS1 to DS3, which are analog signals, are fed from the amplification circuit 6 to the A/D converter 71, they are converted into digital signals, and are then fed to the filter 72. In the filter 72, unnecessary signal components such as noise and signal components in frequency bands deviated far from the frequency band of the burst signal are eliminated or attenuated greatly. The filter 72 is composed of, for example, the band-pass filter BPF 7b and the integrator 7c. A predetermined signal component that has passed through the filter 72 is input to the operator 7d. The operator 7d is used, for example, to measure the distance to an object or obstacle.

The amplified signals DS1 to DS3 are fed not only to the A/D converter 71 but also to the assessor 73. That is, the amplified signals DS1 to DS3 are processed as assessment-target signals. The result of the assessment of the reverberation frequency by the assessor 72 is fed back to the burst signal sending circuit 1 and to the filter 72. The A/D converter 71, the filter 72, and the operator 7d are not essential components, and do not necessarily have to be provided.

Figure 3A:
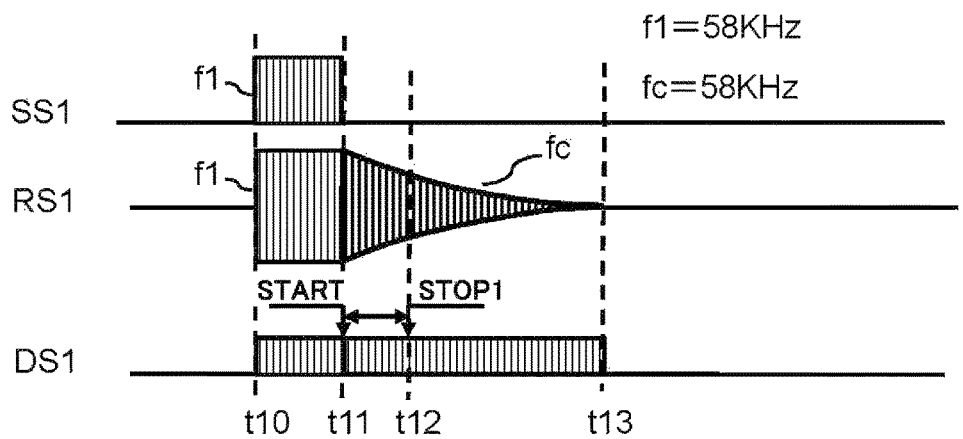
FIG. 3A is a diagram illustrating a relationship between the frequency (burst wave frequency) of a burst signal applied to a piezoelectric element and the reverberation frequency in the present invention (f1=fc)
Figure 3B:
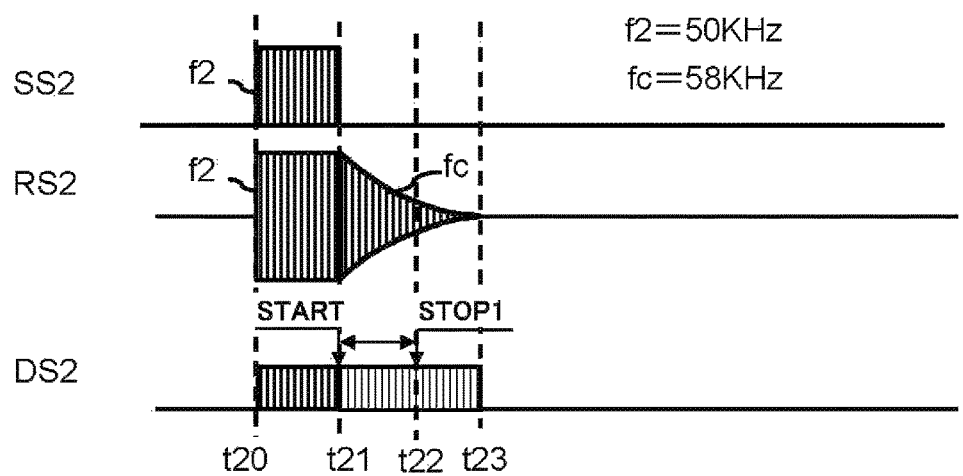
FIG. 3B is a diagram illustrating a relationship between the frequency (burst wave frequency) of a burst signal applied to a piezoelectric element and the reverberation frequency in the present invention (f2<fc)
Figure 3C:
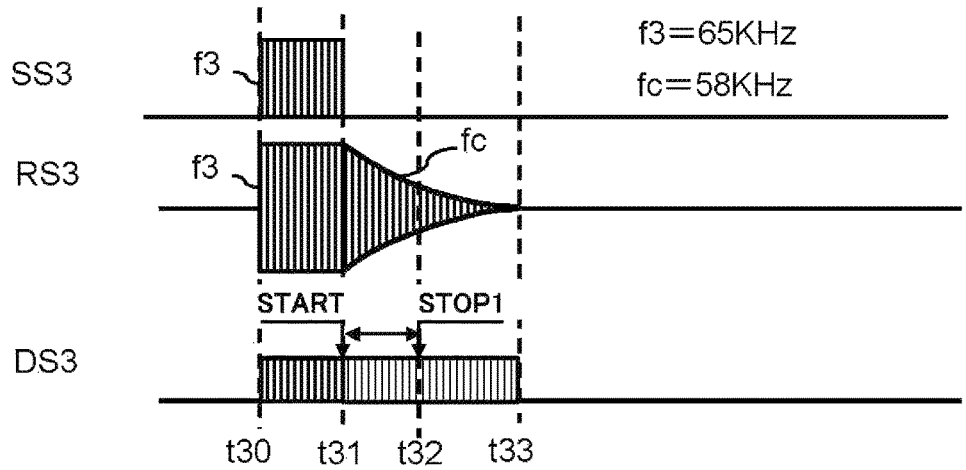
FIG. 3C is a diagram illustrating a relationship between the frequency (burst wave frequency) of a burst signal applied to a piezoelectric element and the reverberation frequency in the present invention (f3>fc)

FIGS. 3A to 3C are conceptual diagrams showing the relationship between the frequency of the burst signal applied to the piezoelectric element 4, that is, the burst wave frequency, and the reverberation frequency.

FIG. 3A shows a case where the burst wave frequency f1 is set at the same value as the resonance frequency fc proper to the piezoelectric element 4. Here, the resonance frequency fc is assumed to be, for example, 58 kHz. Accordingly, the burst wave frequency f1 also is 58 kHz.

The burst signal SS1 is applied to the piezoelectric element 4 between time points t0 and t1. During this period, the ultrasonic signal component of the burst signal SS1 is delivered also to the receiver 5.

The reception signal RS1 is an ultrasonic signal diverted from the reception terminal T2a which is the output of the receiver 5. Between the time points t10 and t11, that is, while the burst signal SS1 is being applied to the piezoelectric element 4, the reception signal RS1 contains largely the same signal component as the burst wave frequency f1. From time point t11 onward, that is, after the application of the burst signal SS1 to the piezoelectric element 4 is cut, the amplitude of the reception signal RS1 decreases gradually with the passage of time. However, since the burst wave frequency f1 is set equal to the resonance frequency f0, the vibration energy of the piezoelectric element 4 is comparatively high, and even when the application of the burst signal SS1 to the piezoelectric element 4 is cut at time point t11, the resonance signal continues being generated till a comparatively late time point t13.

The amplified signal DS1 is output from the amplification circuit 6, and is input to the signal processing circuit 7. The amplified signal DS1 is treated as a target of assessment, that is, a so-called assessment target signal, in the first embodiment. The amplified signal DS1 is an ultrasonic signal resulting from amplification in the amplification circuit 6 of, between time points t10 and t11, the signal component of the burst signal SS1 and, between time points t11 and t13, the reverberation signal. Whereas the amplitude of the reception signal RS1 mentioned previously decreases gradually with the passage of time from time point t11 onward, the amplified signal DS1 is kept at a constant amplitude value irrespective of the passage of time, that is, between time points t11 and t13. This is because the voltage amplification factor of the amplification circuit 6 is sufficiently high, and the comparatively feeble reception signal RS1 occurring around time point t13 can be amplified to the very limit of the dynamic range of the amplification circuit 6. Thus, with the present invention, it is possible to reliably measure up to the time at which the reverberation signal becomes substantially zero, and to perform reliable assessment. Based on the amplified signal DS1, from the time point t11 at which the application of the burst signal SS1 to the piezoelectric element 4 is completed to a predetermined time point t12, the reverberation frequency of the reverberation signal is assessed in the comparator 7h.

FIG. 3B shows a case where the burst wave frequency f2 is deviated to the lower side of the resonance frequency fc proper to the piezoelectric element 4. Here, the resonance frequency fc is assumed to be, for example, 58 kHz. On the other hand, the burst wave frequency f2 is assumed to be lower than the resonance frequency fc and be, for example, 50 kHz.

The burst signal SS2 is applied to the piezoelectric element 4 between time points t20 and t21. During this period, the ultrasonic signal component contained in the burst signal SS2 is delivered also to the receiver 5.

The reception signal RS2 is diverted from the reception terminal T2a which is the output of the receiver 5. Between time points t20 and t21, that is, while the burst signal SS2 is being applied to the piezoelectric element 4, the reception signal RS2 exhibits a signal component of the burst wave frequency f2, that is, of a frequency of about 50 kHz. From time point t21 onward, that is, after the application of the burst signal SS2 to the piezoelectric element 4 is cut, the reception signal RS2 attenuates with the passage of time, but vanishes earlier compared with the reception signal RS1 in FIG. 3A. This is because, since the piezoelectric element 4 were vibrating with the burst signal SS2 deviated from the resonance frequency fc between time points t20 and t21, the vibration energy accumulated between time points t20 and the t21 is not as high. Accordingly, after the application of the burst signal SS2 is cut, a reverberation signal occurs that oscillates at the resonance frequency fc of the piezoelectric element 4, but its duration converges at a time point t23 earlier than the time point t13 shown in FIG. 3A.

The amplified signal DS2 is output from the amplification circuit 6, and is input to the signal processing circuit 7. The amplified signal DS2 is an ultrasonic signal resulting from amplification in the amplification circuit 6 of, between time points 20 and t21, the ultrasonic signal component of the burst signal SS2 and, between time points t21 and t23, the reverberation signal. Whereas the amplitude of the reception signal RS2 mentioned previously decreases with the passage of time from time point t21 onward, the amplified signal DS2 is kept at a constant amplitude value irrespective of the passage of time, that is, between time points t21 and t23. This is because the voltage amplification factor of the amplification circuit 6 is sufficiently high, and the comparatively feeble reception signal RS2 occurring around time point t23 can be amplified to the very limit of the dynamic range of the amplification circuit 6. Thus, with the present invention, it is possible to reliably measure up to the time at which the reverberation signal becomes substantially zero, and to perform reliable assessment. Based on the amplified signal DS2, from the time point t21 at which the application of the burst signal SS2 to the piezoelectric element 4 is completed to a predetermined time point t22, the reverberation frequency of the reverberation signal is assessed in the comparator 7h shown in FIG. 2.

FIG. 3C shows a case where the burst wave frequency f3 is deviated to the higher side of the resonance frequency fc proper to the piezoelectric element 4. Here, the resonance frequency fc is assumed to be, for example, 58 kHz. On the other hand, the burst wave frequency f3 is assumed to be higher than the resonance frequency fc, and be, for example, 65 kHz.

The burst signal SS3 is applied to the piezoelectric element 4 between time points t30 and t31. During this period, the ultrasonic signal component of the burst signal SS3 is delivered also to the receiver 5.

The reception signal RS3 is diverted from the reception terminal T2a which is the output of the receiver 5. Between time points t30 to t31, that is, while the burst signal SS3 is being applied to the piezoelectric element 4, the reception signal RS3 exhibits a signal component of the burst wave frequency f3, that is, of a frequency of 65 kHz. From time point t31 on, that is, after the application of the burst signal SS3 to the piezoelectric element 4 is cut, the reception signal RS3 attenuates gradually with the passage of time, but vanishes earlier than in FIG. 3A. This is because, since the piezoelectric element 4 was vibrating with the burst signal SS3 deviated from the resonance frequency fc between time points t30 and t31, the vibration energy accumulated between time points the t30 to t31 is not as high. Accordingly, after the burst signal SS3 is cut, a reverberation signal occurs that has the resonance frequency fc of the piezoelectric element 4, but its duration converges at a time point t23 earlier than the time point t13 shown in FIG. 3A.

The amplified signal DS3 is output from the amplification circuit 6, and is input to the signal processing circuit 7. The amplified signal DS3 is an ultrasonic signal resulting from amplification in the amplification circuit 6 of, between time points t30 and t31, the signal component of the burst signal SS3 and, between time points t31 and t33, the reverberation signal. Whereas the amplitude of the reception signal RS3 mentioned previously decreases gradually with the passage of time from time point t31 onward, the amplified signal DS3 is kept at a constant amplitude value irrespective of the passage of time, that is, between time points t31 and t33. This is because the voltage amplification factor of the amplification circuit is sufficient high, and the comparatively feeble reception signal RS3 occurring around time point t33 can be amplified up to the very limit of the dynamic range of the amplification circuit 6. Thus, with the present invention, it is possible to measure up to the time at which the reverberation signal becomes substantially zero, and to perform reliable assessment. Based on the amplified signal DS3, from the time point t31 at which the application of the burst signal SS3 to the piezoelectric element 4 is completed to a predetermined time point t32, the reverberation frequency of the reverberation signal is assessed in the comparator 7h shown in FIG. 2.

FIG. 4 is a timing chart of the first embodiment. FIG. 4(a) shows the assessment target signal DS1. The assessment target signal DS1 can be any of the amplified signals DS1 to DS3 extracted from the output of the amplification circuit 6. The frequency of the assessment target signal DS1 is equal to the burst wave frequency. In the present description, the burst wave frequency is, for example, 20 kHz to 80 kHz. In one embodiment of the present invention, the number of periods of the assessment target signal DS1 is represented by the symbol N. With respect to periods, N=1, 2, 3, or 4 means one, two, three, or four periods respectively. In the present invention, the number of periods is set at, for example, four, that is, N=4.

FIG. 4(b) shows the pulse signals OSC output from the high-speed OSC 7k. The frequency of the pulse signals OSC is, for example, 10 MHz, and is two orders of magnitude higher than the burst wave frequency, which is 20 kHz to 80 kHz. Hence "high-speed" in the high-speed OSC 7k. As the frequency of the pulse signals OSC is increased, the assessment accuracy of the reverberation frequency is enhanced; this, on the other hand, requires an oscillator that oscillates at a high frequency, and is somewhat disadvantageous in terms of anti-noise characteristics and costs. In one embodiment of the present invention, the number of pulse counts of the pulse signals OSC during four periods of the assessment target signal DS1 is assessed as the reverberation frequency and the reverberation time.

FIG. 4(c) shows the assessment start signal START. As mentioned previously, after the burst signal sending circuit 1A completes transmission of the burst signal SS1, it transmits the burst transmission completion signal START to the counter 7f and the logic controller 7i. The assessor 73 starts assessment from the burst transmission completion signal START. In this embodiment, the assessment start signal START is transmitted in the high-level H period between time points t10 and t11.

FIG. 4(d) shows an assessment end signal STOP1. The assessment end signal STOP1 is input from the comparator 7h to the logic controller 7i. For example, the set span in the assessment span set register is four periods; four-period worth (N=4) of the assessment target signal DS1 is counted from time point t10 in the comparator 7h, and the assessment end signal STOP1 is generated until time points t11 to t11a at which four periods expire.

FIG. 4(e) shows an assessment span signal DP of the logic controller 7i. The assessment span signal DP is a signal that is unambiguously determined from the assessment start signal START shown in FIG. 4(c) and the assessment end signal STOP shown in FIG. 4(d); that is, the time points t10a and t11a at which these signals turn from high level H to low level L are detected. Instead, the time points t10 and t11 at which those signals turn from low level L to high level H may be detected.

FIG. 4(f) schematically shows the result of the assessment performed in the reverberation frequency assessor 7j. To the reverberation frequency assessor 7j, there are applied the assessment span signal DP from the logic controller 7i and the pulse signals OSC from the high-speed OSC 7k. The number of pulse signals OSC counted in a predetermined span of the assessment target signal DS1 is stored as the assessment result in the reverberation frequency assessor 7j. That is, the number of pulse counts of the pulse signals OSC in the high-level H period of the assessment span signal DP shown in FIG. 4(e) is stored as the assessment result in the reverberation frequency assessment result hold register 7L.

Let the frequency of the pulse signals OSC generated in the signal processing circuit 7 be $f_{OSC}$, the number of assessment spans be p, and the count value in the assessment spans be q, then the reverberation frequency fRT is given by fRT=fosc/(q/p). Here, assuming fosc=10 MHz, p=4, and q=689 gives a reverberation frequency fRT=10000/(689/4)≈58 kHz.

FIG. 5 is a flow chart of adjustment of the burst wave frequency in the first embodiment of the present invention shown in FIGS. 2 to 4. Steps 501 through 504 are performed by the burst signal sending circuit 1A.

At step 501, the burst wave number of the burst signal S0 is set in the burst signal sending circuit 1A, in the burst wave number set register 11. The burst wave number is a parameter that greatly affects the measurement accuracy and power consumption of the ultrasonic sensor. In this embodiment, the burst wave number is set at, for example, four.

At step 502, the default frequency of the first burst waves of the burst signal S0 is set in the burst signal sending circuit 1A, in the default burst wave (burst signal) frequency set register 12. To measure and assess a reverberation frequency, the frequency waves of the burst signal that is sent at the start has to be determined. The default burst wave frequency is set, for example, in an ideal environment where the piezoelectric element 4 is not affected by any extraneous change.

At step 503, the timing at which the burst signal sending circuit 1 sends the burst signal S0 is set. The send timing is performed by detecting, for example, the rising edge of a transmission start pulse output from the burst transmission start register 13. At this time, the burst signal S0 set in the burst wave number set register 11 and the default burst wave frequency set register 12 is delivered to the driver circuit 2 via the sending terminal T1a.

At step 504, for example, at the falling edge of the transmission start pulse set in the burst transmission start register 13, the sending of the burst signal S0 is completed.

At step 505, by detecting, for example, the falling edge of the transmission start pulse set in the burst transmission start register 13, the burst transmission completion signal START is transmitted from the burst signal sending circuit 1. Instead, the previously-mentioned transmission start pulse may be transmitted as the transmission completion signal START to the signal processing circuit 7. There, the logic controller 7i and the counter 7f receive the START signal, and the circuit operation of the assessor 73 starts.

Step 506 is performed in the comparator 7h provided in the signal processing circuit 7B. In the comparator 7h, the set value (N) in the assessment span set register 7g and the cumulative value (n) in the counter 7f are compared together. Here, the set value (N) corresponds to the number of periods of the assessment target signal DS1 shown in FIG. 4(a), and in the present invention, N=4. The set value (N) corresponds to the maximum number of the number of periods of the assessment target signal DS1. On the other hand, the cumulative value (n) is a value that indicates how many periods of the assessment target signal DS1 have been repeated, and in one embodiment of the present invention, it changes like n=1, 2, 3, and so forth, becoming when n=4 equal to N=4. Accordingly, at step 506, the number of periods of the assessment target signal DS1 is counted, and until it reaches the number of the set value (N), the assessment target signal DS1 continues being applied, so that the process indicated by "YES" is continued.

Step 507 is preformed in the comparator 7h. The comparator 7h outputs an assessment completion signal when the assessment cumulative value (n) is not smaller than the set value (N) (NO), that is, when the cumulative value (n) in the counter 7f reaches the set value (N) in the register 7f (n=N). For example, the comparator 7h outputs a low-level L signal when the cumulative value (n) is smaller than the set value (N), and outputs a high-level H signal when the cumulative value (n) is equal to the set value (N). At that time, the high level H of the comparator 7h is input as the assessment span end signal STOP1 to the logic controller 7i. At the time point that the cumulative value (n) in the counter 7f reaches the set value (N) in the register 7f, the circuit operation of the logic controller 7i stops.

Step 508 is performed in the reverberation frequency assessor 7j. The reverberation frequency is assessed. For example, the number of pulse signals OSC during the span of the set value N=4 is counted, and from the value counted, the reverberation frequency is assessed.

Step 509 is performed in the reverberation frequency assessment result hold register 7L, and the assessed reverberation frequency is held.

Step 510 is performed in the reverberation frequency assessor 7j, and the value of the reverberation frequency stored in the reverberation frequency assessment result hold register 7L is fed back to the burst signal sending circuit 1 and the filter 72. The assessed reverberation frequency is, as the optimal sending frequency of the burst signal sending circuit 1A, reflected in the setting of the burst wave frequency. Moreover, based on the assessed reverberation frequency, the selectivity (Q, that is, quality factor) and the band width of the filter 72 is adjusted such that signals having frequencies greatly deviated from the reverberation frequency band are attenuated greatly. Step 509 may be omitted, in which case information on the reverberation frequency signal assessed in the reverberation frequency assessor 7j can be directly fed back to the burst signal sending circuit 1 and the signal processing circuit 7.

In the ultrasonic sensor 1000A according to the first embodiment described above, the burst wave frequency is automatically corrected according to change in the proper vibration frequency of the piezoelectric element even under the influence of extraneous change, and thus it is possible to suppress a drop in transmission/reception sensitivity ascribable to extraneous change. The electrical characteristics of the filter that filters the reception signal are also adjusted, and thus it is possible to enhance the sensing accuracy of the ultrasonic sensor and thereby further enhance the anti-noise characteristics; it is thus possible to further enlarge the application range of the ultrasonic sensor.

Second Embodiment

Figure 6:
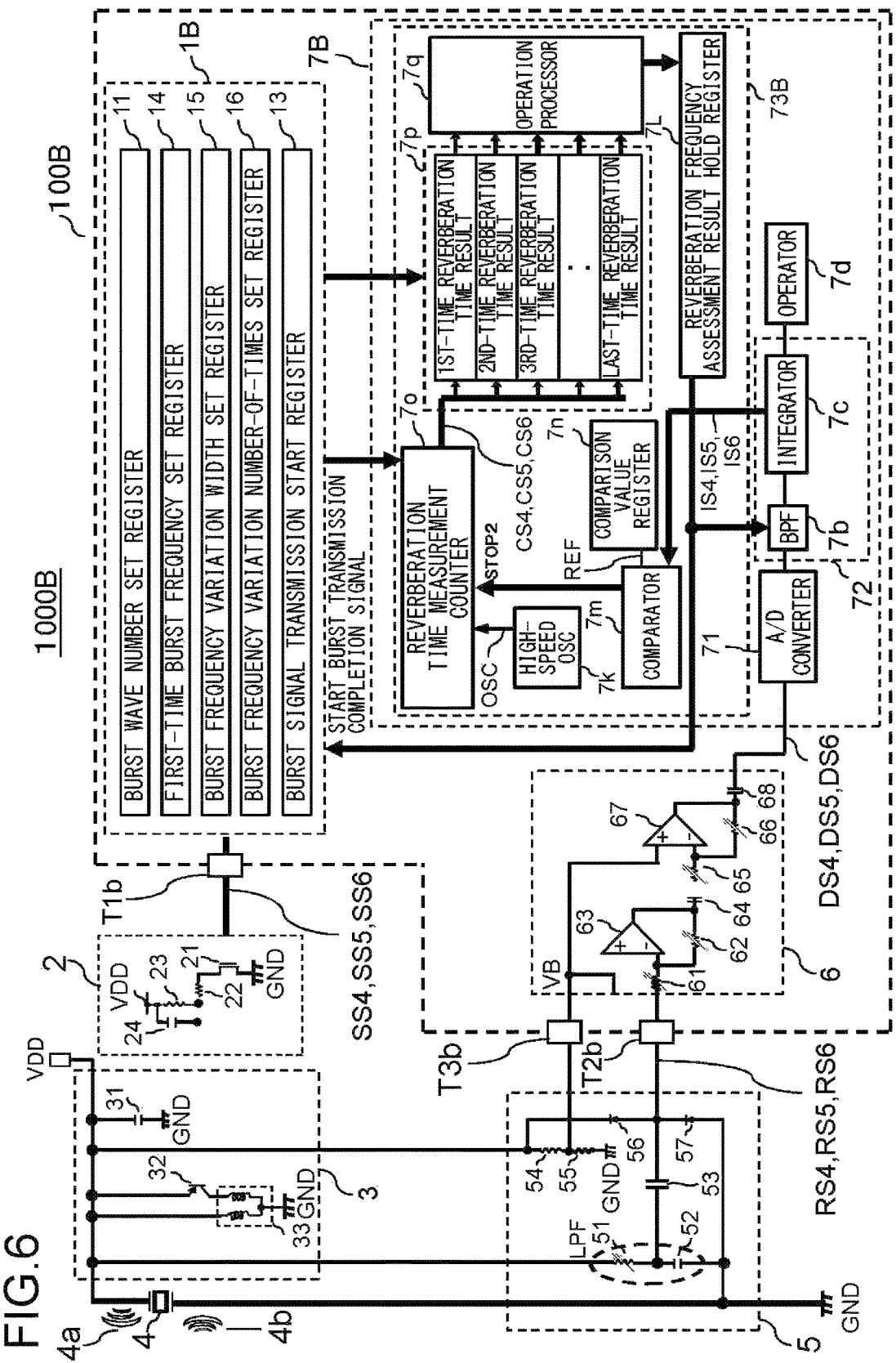
FIG. 6 is a specific circuit configuration diagram showing a second embodiment of the present invention.

FIG. 6 is a circuit configuration diagram showing a second embodiment of the present invention. The ultrasonic sensor 1000B of this configuration differs greatly from the ultrasonic sensor 1000A of the first embodiment shown in FIG. 2 in the following three aspects. First, the burst signal sending circuit 1B includes, instead of the default burst wave frequency set register 12, a first-time burst wave frequency set register 14, a burst wave frequency variation width set register 15, and a burst wave frequency variation number-of-times set register 16. Second, the assessor 73B in the signal processing circuit 7B connects to the output of the filter 72. Third, the assessor 73B includes a comparator 7m, a comparison value register 7n, a reverberation time measurement counter 7o, a memory 7p, and an operation processor 7q.

FIGS. 7A to 7C are timing charts illustrating the circuit operation of the second embodiment shown in FIG. 6, and illustrate, in particular, measurement of the reverberation time. The following description, proceeding with reference to FIGS. 7A to 7C, also discusses the circuit operation of the burst signal sending circuit 1B and the assessor 73B.

Here, it is for convenience' sake that three timing charts, namely FIGS. 7A to 7C, are given. In reality, it is common to measure a reverberation time not only three times, as in FIGS. 7A to 7C, but ten and several times, or several tens of times. The setting of the number of times of measurement is performed in the burst wave frequency set register provided in the burst signal sending circuit 1B in FIG. 6. FIGS. 7A to 7C are not necessarily given in the order of measurement.

FIG. 7A shows a case where the burst wave frequency f4 is set at the same value as the resonance frequency fc proper to the piezoelectric element 4. Here, the resonance frequency fc is assumed to be, for example, 58 kHz. Accordingly, the burst wave frequency f4 also is 58 kHz.

In FIG. 7A, the burst signal SS4 is applied to the piezoelectric element 4 between time points t40 and t41. From time point t41 onward, the application of the burst signal SS4 to the piezoelectric element 4 is cut.

The reception signal RS4 is an ultrasonic signal diverted from the reception terminal T2b which is the output of the receiver 5. The reception signal RS4 has the same ultrasonic signal component as the burst wave frequency f4 between time points t40 and t41, that is, while the burst signal SS4 is being applied to the piezoelectric element 4. From time point t41 onward, that is, after the application of the burst signal SS4 to the piezoelectric element 4 is cut, the amplitude of the reception signal decreases gradually with the passage of time. However, since the burst wave frequency f4 is set equal to the resonance frequency f0 of the piezoelectric element 4, the ultrasonic signal that occurs from the time point t41 onward, that is, the reverberation signal, is continued till a comparatively late time point t42.

The amplified signal DS4 is output from the amplification circuit 6, and is input to the signal processing circuit 7B. The amplified signal DS4 is an ultrasonic signal resulting from amplification in the amplification circuit 6 of, between time points t40 and t41, the ultrasonic signal component of the burst signal SS4 and, between time points t41 and t42, the reception signal. Whereas the amplitude of the reception signal RS4 mentioned previously decreases gradually with the passage of time from time point t41 onward, the amplified signal DS4 keeps a constant amplitude value irrespective of the passage of time, that is, between time points t40 and t42. This is because the voltage amplification factor of the amplification circuit 6 is sufficiently high, and the comparatively feeble amplified signal DS4 occurring around time point t42 can be amplified to the very limit of the dynamic range of the amplification circuit 6. Thus, with the present invention, it is possible to reliably detect the reverberation time up to when the reverberation signal becomes substantially zero, and to perform reliable assessment. The amplified signal DS4 is input to the integrator 7c via the A/D converter 71.

The integral signal IS4 is output from the integrator 7c. The voltage amplitude value of the integral signal IS4 peaks at time point t42, and thereafter decreases gradually. Here, let the time point at which the integral signal IS4, in the process of increasing, reaches a comparison value REF be t41, and the time point at which it, in the process of decreasing, becomes equal to the comparison value REF be t43, then the assessment of the reverberation time starts at time point t41 and stops at time point t43. When time point t43 is reached, the comparator 7m transmits a stop signal STOP2 to the reverberation time measurement counter 7o. The comparison value REF is given to the comparison value register 7n.

The reverberation time CS4 is a time measured in the integrator 7c through comparison between the integral signal IS4 and the comparison value REF. The reverberation time CS4 is not quite the reverberation time of the reverberation signal, but has a value proportional to the net reverberation time. The burst signal sending circuit 1B delivers the burst signal SS4 to the driver circuit 2, and on completing the delivery, transmits the burst transmission completion signal START to the assessor 73B in the signal processing circuit 7B. At this time, the reverberation time measurement counter 7o receives the burst transmission completion signal START at time point t41 and starts to measure the reverberation time CS4. This measurement continues till the time point t43 at which the stop signal STOP2 is applied from the comparator 7m. During the period leading to time points t41 to t43, the measurement proceeds by counting the number of pulse signals OSC input from the high-speed OSC 7k. The time width of that period is indicated as the reverberation time T4. The reverberation time T4 is, along with the burst wave frequency f4 of the burst signal SS4, stored in the memory 7p.

The number of times of measurement of the reverberation time is determined by the burst wave frequency variation number-of-times set register 16 provided in the burst signal sending circuit 1B in FIG. 6. The number of times set in the burst wave frequency variation number-of-times set register 16 is determined based on the respective set values in the burst wave number set register 11, the first-time burst wave frequency set register 14, and the burst wave frequency variation width set register 15, the required measurement accuracy of the reverberation time, and the like.

FIG. 7B shows a case where the burst wave frequency f5 is deviated to the lower side of the resonance frequency fc proper to the piezoelectric element 4. Here, the resonance frequency fc is assumed to be, for example, 58 kHz. On the other hand, the burst wave frequency f5 is assumed to be lower than the resonance frequency fc, and be, for example, 50 kHz.

The burst signal SS5 is applied to the piezoelectric element 4 between time points t50 and t51. From time point t51 onward, the application of the burst signal SS5 to the piezoelectric element 4 is cut.

The reception signal RS5 is an ultrasonic signal diverted from the reception terminal T2b which is the output of the receiver 5. The reception signal RS5 has the burst wave frequency f5, that is, an ultrasonic signal component of a frequency of about 50 kHz, between time points t50 and t51, that is, while the burst signal SS5 is being applied to the piezoelectric element 4. From time point t51 onward, that is, after the application of the burst signal SS5 to the piezoelectric element 4 is cut, the reception signal RS5 attenuates gradually with the passage of time, but vanishes earlier than in FIG. 7A. This is because, since the piezoelectric element 4 were vibrating with the burst signal SS5 deviated from the resonance frequency fc between time points t50 and t51, the vibration energy accumulated between time points t50 and t51 is not as high. Thus, after the burst signal SS5 is cut, a reverberation signal that vibrates at the resonance frequency fc of the piezoelectric element 4 occurs, but its duration converges at a time point t52 earlier than time point t42 shown in FIG. 7A.

The amplified signal DS5 is output from the amplification circuit 6, and is input to the signal processing circuit 7B. The amplified signal DS5 is an ultrasonic signal resulting from amplification in the amplification circuit 6 of, between time points t50 and t51, the ultrasonic signal component of the burst signal SS5 and, between time points t51 and t52, the reverberation signal. The time point t52 at which the generation of the amplified signal DS5 is completed comes earlier than time point t42. Whereas the amplitude of the reception signal RS5 mentioned previously decreases gradually with the passage of time from time point t51 onward, the amplified signal DS5 is kept at a constant amplitude value between time points t50 and t52, that is, between time points t50 and t52. This is because the voltage amplification factor of the amplification circuit 6 is sufficiently high, and the comparatively feeble reception signal RS5 occurring around time point t52 can be amplified to the very limit of the dynamic range of the amplification circuit 6. Thus, with the present invention, it is possible to reliably measure up to the time at which the reverberation signal becomes substantially zero, and to perform reliable assessment. The amplified signal DS5 is delivered to the integrator 7c via the A/D converter 71.

The integral signal IS5 is output from the integrator 7c. The voltage amplitude value of the integral signal IS5 peaks at time point t52, and thereafter decreases gradually. Here, let the time point t51 at which the integral signal IS5, in the process of increasing, reaches the comparison value REF be t51, and the time point at which it, in the process of decreasing, becomes equal to the comparison value REF be t53, then the assessment of the reverberation time starts at time point t51 and stops at time point t53. When time point t53 is reached, the comparator 7m transmits the stop signal STOPS to the reverberation time measurement counter 7o. The comparison value REF is given to the comparison value register 7n.

The reverberation time CS5 is a time that is measured in the reverberation time measurement counter 7o through comparison between the integral signal IS5 and the comparison value REF. The reverberation time CS5 is not quite the reverberation time of the reverberation signal, but has a value proportional to the net reverberation time. The burst signal sending circuit 1B delivers the burst signal SS5 to the driver circuit 2, and on completing the delivery, transmits the burst transmission completion signal START to the assessor 73B in the signal processing circuit 7B. At this time, the reverberation time measurement counter 7o receives the burst transmission completion signal START at time point T51 and simultaneously starts to measure the reverberation time CS5. This measurement continues till the time point T53 at which the stop signal STOPS is applied from the comparator 7m. During the period leading to time points t51 to t53, the measurement proceeds by counting the number of pulse signals OSC input from the high-speed OSC 7k. The time width of this period is indicated as the reverberation time T5. The reverberation time T5 is, along with the burst wave frequency f5 of the burst signal SS5, stored in the memory 7p.

FIG. 7C shows a case where the burst wave frequency f6 is deviated to the higher side of the resonance frequency fc proper to the piezoelectric element 4. Here, the resonance frequency fc is assumed to be, for example, 58 kHz. On the other hand, the burst wave frequency f5 is assumed to be higher than the resonance frequency fc, and be, for example, 65 kHz.

The burst signal SS6 is applied to the piezoelectric element 4 between time points t60 and t61. From time point t61 onward, the application of the burst signal SS6 to the piezoelectric element 4 is cut.

The reception signal RS6 is an ultrasonic signal diverted from the reception terminal T2b which is the output of the receiver 5. The reception signal RS6 has the burst wave frequency f6, that is, an ultrasonic signal component of a frequency of about 65 kHz, between time points t60 and t61, that is, while the burst signal SS6 is being applied to the piezoelectric element 4. From time point t61 onward, that is, after the application of the burst signal SS6 to the piezoelectric element 4 is cut, the reception signal RS6 attenuates gradually with the passage of time, but vanishes earlier, though later than the reception signal RS5 shown in FIG. 7B. This is because, since the piezoelectric element 4 were vibrating with the burst signal SS6 deviated from the resonance frequency fc between time points t60 and t61, the vibration energy accumulated between time points t60 and t61 is not as high, through slightly higher than the reception signal RS5. Thus, after the burst signal SS6 is cut, a reverberation signal that vibrates at the resonance frequency fc of the piezoelectric element 4 occurs, but its duration converges at a time point t62 earlier than time point t42 shown in FIG. 7A but later than time point t52.

The amplified signal DS6 is output from the amplification circuit 6, and is input to the signal processing circuit 7B. The amplified signal DS6 is an ultrasonic signal resulting from amplification in the amplification circuit 6 of, between time points t60 and t61, the ultrasonic signal component of the burst signal SS6 and, between time points t61 and t62, the reverberation signal. The time point t62 at which the generation of the amplified signal DS6 is completed comes earlier than time point t42 shown in FIG. 7A but later than time point t52 shown in FIG. 7B. Whereas the amplitude of the reception signal RS6 mentioned previously decreases gradually with the passage of time from time point t61 onward, the amplified signal DS6 is kept at a constant amplitude value irrespective of the passage of time, that is, between time points t60 and t62. This is because the voltage amplification factor of the amplification circuit 6 is sufficiently high, and the comparatively feeble reception signal RS6 occurring around time point t62 can be amplified to the very limit of the dynamic range of the amplification circuit 6. Thus, with the present invention, it is possible to reliably measure up to the time at which the reverberation signal becomes substantially zero, and to perform reliable assessment. The amplified signal DS5 is delivered to the integrator 7c via the A/D converter 71.

The integral signal IS6 is output from the integrator 7c. The voltage amplitude value of the integral signal IS6 peaks at time point t62, and thereafter decreases gradually. Here, let the time point t61 at which the integral signal IS6, in the process of increasing, reaches the comparison value REF be t61, and the time point at which it, in the process of decreasing, becomes equal to the comparison value REF be t63, then the assessment of the reverberation time starts at time point t61 and stops at time point t63. When time point t63 is reached, the comparator 7m transmits the stop signal STOP6 to the reverberation time measurement counter 7o. The comparison value REF is given to the comparison value register 7n.

The reverberation time CS6 is a time that is measured in the reverberation time measurement counter 7o through comparison between the integral signal IS6 and the comparison value REF. The reverberation time CS6 is not quite the reverberation time of the reverberation signal, but has a value proportional to the net reverberation time. The burst signal sending circuit 1B delivers the burst signal SS6 to the driver circuit 2, and on completing the delivery, transmits the burst transmission completion signal START to the assessor 73B in the signal processing circuit 7B. At this time, the reverberation time measurement counter 7o receives the burst transmission completion signal START at time point T61 and simultaneously starts to measure the reverberation time CS6. This measurement continues till the time point T63 at which the stop signal STOPS is applied from the comparator 7m. During the period leading to time points t61 to t63, the measurement proceeds by counting the number of pulse signals OSC input from the high-speed OSC 7k. The time width of this period is indicated as the reverberation time T5. The reverberation time T6 is, along with the burst wave frequency f6 of the burst signal SS6, stored in the memory 7p. The reverberation time T6 is longer (larger) than the reverberation time T5 shown in FIG. 7B but shorter (smaller) than the reverberation time T4 shown in FIG. 7A.

FIGS. 7A to 7C illustrate three instances of reverberation frequency assessment that is performed ten and several times or several tens of times. However, in actual assessment of the reverberation time, assuming, for example, that a burst wave number N=4 is set in the burst wave number set register 11, that 40 kHz is set in the first-time burst wave frequency set register 14, that 1 kHz is set in the burst wave frequency variation width set register 15, and that 41 times is set in the burst wave frequency variation number-of-times set register 16, then reverberation frequency assessment is performed in the range of 40 kHz to 80 kHz in 1 kHz steps. Needless to say, the width of the steps in which the burst wave frequency is varied may be set at, instead of 1 kHz, for example, 2 kHz or 5 kHz. In those cases, the number of times that reverberation frequency assessment is performed is reduced, but the assessment accuracy is lower.

Anyway, in burst wave frequency assessment according to the present invention, the burst wave frequency is adjusted in multiple stages, the duration of a reverberation signal or a signal resulting from processing of a reverberation signal, that is, an integral signal of the reverberation signal, is measured, and the frequency of the burst signal generated in the burst signal sending circuit 1B is adjusted to the burst wave frequency corresponding to the longest of all the measured times.

FIG. 8 is a flow chart illustrating the circuit operation in the first embodiment. FIG. 8 will now be described with reference to FIGS. 5 to 7A to 7C. Step 801 is substantially the same as step 501 shown in FIG. 8, and there the burst wave number of the burst signal S0 is set. The burst wave number is set at, for example, four. The burst wave number affects the measurement accuracy and power consumption of the ultrasonic sensor.

At step 802, the burst wave frequency is set in the first-time burst wave frequency set register 14. This is a parameter that determines one end of the frequency range in which to perform assessment. For example, in this embodiment, the first-time value of the first-time burst wave frequency A is set at 40 kHz. In this case, burst wave frequency assessment starts at a burst wave frequency of 40 kHz.

At step 803, the variation width is set in the burst wave frequency variation width set register 15. This is a parameter that determines the resolution of frequencies at which to perform assessment. For example, when in this embodiment the burst wave frequency variation width B is set at 1 kHz, the burst wave frequency is adjusted in 1 kHz steps. Accordingly, when the burst wave frequency A that is assessed first is 40 kHz, the burst wave frequency A that is assessed next time is set at 41 kHz.

At step 804, the number of times M that the burst wave frequency is varied is set in the burst wave frequency variation number-of-times set register 16. When in this embodiment the burst wave frequency variation number-of-times M is set at, for example, M=40, the number of times M that the burst wave frequency is assessed is 41, and the burst wave frequency that is assessed last is 80 kHz.

Steps 801 through 804 correspond to the initial setting performed in the burst signal sending circuit 1B.

At step 805, the counter (unillustrated) that measures the number of times of burst transmission in the burst signal sending circuit 1B is reset. At step 805, on completion of the initial setting at steps 801 through 804, the count value m of the transmission number-of-times counter is reset to zero.

At step 806, the transmission number-of-times count value m and the burst wave frequency variation number-of-times M set at step 804 are compared together. When the transmission number-of-times count value m has not reached the burst wave frequency variation number-of-times M, that is, when the check result is "NO", the following steps, steps 807 through 813, are performed repeatedly. When the transmission number-of-times count value m reaches the burst wave frequency variation number-of-times M, that is, when the check result is "YES", the flow proceeds to steps 814 through 816.

At step 807, an unillustrated transmission start pulse is sent from the burst transmission start register 13. For example, at the rising edge of the transmission start pulse, the burst signal SS4 to SS6 is transmitted to the driver circuit 2.

At step 808, for example, at the falling edge of the transmission start pulse output from the burst transmission start register 13, the transmission of the burst signal SS4 to SS6 is completed.

At Step 809, the reverberation time of the reverberation signal output from the piezoelectric element 4 starts to be measured (assessed). At steps 807 and 808, the burst signal SS4 to SS6 is applied to the piezoelectric element 4 via the sending terminal T1b. At step 809, when the application of the burst signal SS4 to SS6 to the piezoelectric element 4 is completed, for example, the falling edge of the transmission start pulse set in the burst transmission start register 13 is detected, and the burst signal sending circuit 1B sends to the reverberation time measurement counter 7o in the signal processing circuit 7B the burst transmission completion signal START. Needless to say, the falling edge of the transmission start pulse may be transmitted directly as the transmission completion signal START to the signal processing circuit 7B. There, the reverberation time measurement counter 7o receives the START signal, measurement of the reverberation time is started.

At step 810, the integral signal IS4 to IS6 in the integrator 7c and the comparison value REF from the comparison value register 7n are compared together in the comparator 7m. If the integral signal IS4 to IS6 is higher than the comparison value REF, the comparator 7m outputs, for example, a high level H. If the integral signal IS4 to IS6 is lower than the comparison value REF, the comparator 7m outputs, for example, a low level L. The timing at which the output of the comparator 7m turns, for example, from high level H to low level L is conveyed to the reverberation time measurement counter 7o.

At step 811, for example, the falling edge of the output of the comparator 7m turning from high level H to low level L is detected, and as a stop signal STOP2, the measurement by the reverberation time measurement counter is stopped.

At step 812, the reverberation time is held. The reverberation time from the start of reverberation time measurement at step 809 till the end of reverberation time measurement at step 811 is measured by the high-speed OCS 7k, and the reverberation time signal CS is sent. The reverberation time signal CS and, from the burst signal sending circuit 1B, a burst sending frequency signal corresponding to a reverberation signal are held in the memory 7p. In the memory 7p, assessment results up to the last instance of assessment are held like, for example, a "first-time reverberation time result", a "second-time reverberation time result", a "third-time reverberation time result", and so forth.

At step 813, the burst wave frequency is changed, and the number of times that it is changed is counted. The changing of the burst wave frequency is performed until the condition set at step 806 is fulfilled.

At step 813, the transmission number-of-times count is incremented, and the transmission number-of-times count value m is compared with the initially set frequency variation number-of-times M. If the transmission circuit count value m does not exceed the set frequency variation number-of-times N, the frequency of the burst signal SS4 to SS6 is changed, and the reverberation time is assessed. When the transmission circuit count value n reaches the frequency variation number-of-times M, that is, when the check result is "YES", the flow proceeds to steps 814 through 816.

Step 814 is performed in the operation processor 7q, and after all the burst waves for the set frequencies have been sent, the reverberation time results are subjected to computation. In this computation, the operation processor 7q compares together the plurality of (for example, 41) reverberation times in the memory 7p to select the sending frequency corresponding to the longest reverberation time (for example, 58 kHz), and takes it as the assessed reverberation frequency of the piezoelectric element 4.

At step 815, the reverberation frequency assessment result hold register 7L saves the assessed reverberation frequency.

At step 816, the assessed reverberation frequency is fed back to the burst signal sending circuit 1A and the A/D converter 71. Thus, as the optimal sending frequency of the burst signal sending circuit 1B, the frequency of the transmitted burst is set. Moreover, the filter 72 can reduce signals having frequencies other than the assessed reverberation frequency.

The set range of sending frequencies and the resolution of the second embodiment are not limited to those mentioned above, but may be modified freely. For example, for a wider detection range, detection may be performed by rough adjustment combined with fine adjustment. Specifically, for rough adjustment, the initial burst wave frequency is set at A=40 kHz, the burst wave frequency variation width is set at B=10 kHz, and the variation number-of-times is set at M=4. That is, the reverberation time is assessed at each of 40 kHz, 50 kHz, 60 kHz, 70 kHz, and 80 kHz.

Figure 9:
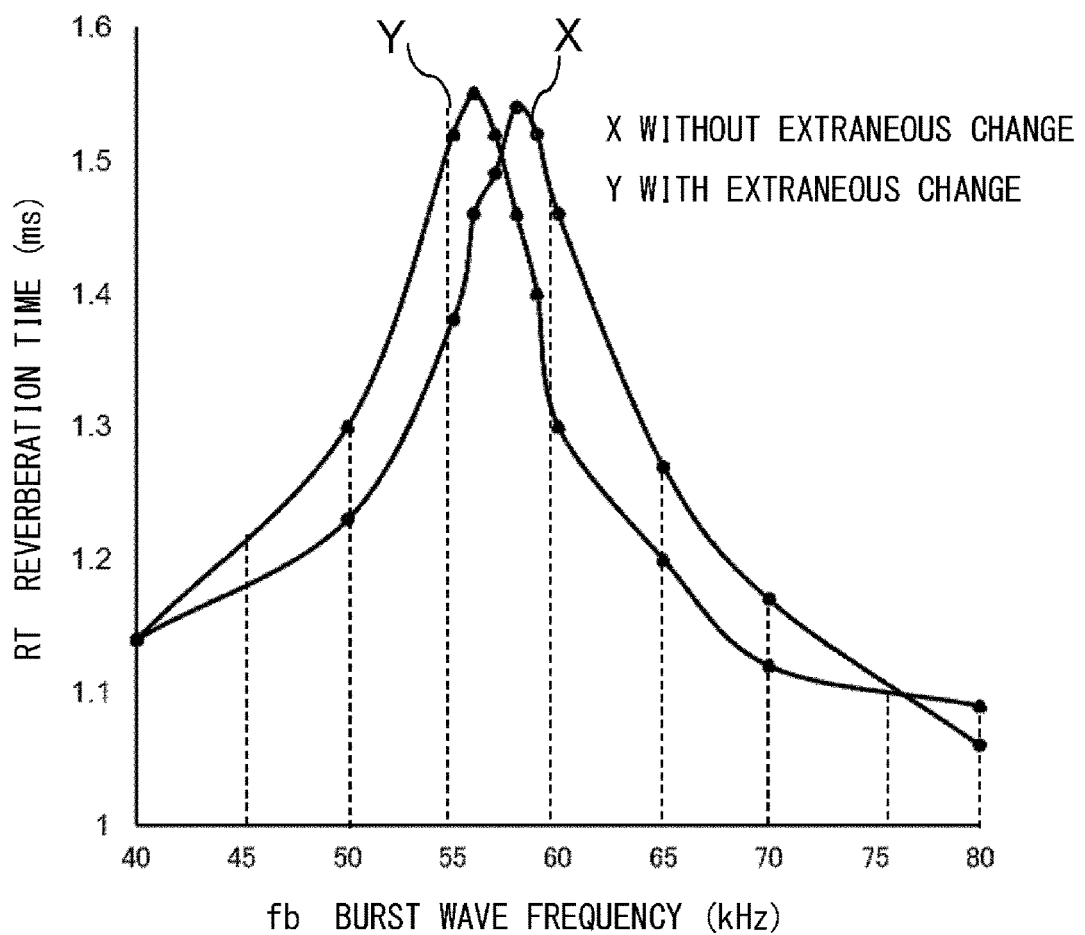
FIG. 9 is a diagram showing the transition of reverberation frequency versus burst wave frequency as compared between cases without and with extraneous change around a piezoelectric element in the second embodiment of the present invention.

FIG. 9 relates to the second embodiment (FIG. 6) of the present invention, and is a transition diagram of the reverberation frequency versus the burst wave frequency as compared between cases without and with extraneous change around the piezoelectric element. Along the horizontal axis is taken the burst wave frequency fb, and along the vertical axis is taken the reverberation time RT of the reverberation signal. In the present description, "without extraneous change" denotes a case where no extraneous matter is attached to the sensor part where the piezoelectric element 4 is mounted. On the other hand, "with extraneous change" denotes a case where moisture is intentionally attached to the sensor part. As indicated by the symbol X, "without extraneous change", the reverberation time RT was the longest when the burst wave frequency fb was set at the same frequency as the resonance frequency fc, namely at 58 kHz, the reverberation time RT being about 1.55 ms. By contrast, when the burst wave frequency was set lower than the resonance frequency fc, namely at 50 kHz, the reverberation time RT was 1.22 ms, an about 21% shorter result; when the burst wave frequency was set higher than the resonance frequency fc, namely at 65 KHz, the reverberation time RT was 1.27 ms, an about 18% shorter result.

As indicated by the symbol Y, "with extraneous change", the peak value of the reverberation time RT shifted in the lower direction from the burst wave frequency of 58 kHz, and the reverberation time RT was the longest with the burst wave frequency fb at 55 kHz, the reverberation time RT at that time being largely the same as "without extraneous change", specifically about 1.55 ms. It was found that the response of the reverberation time RT versus the burst wave frequency "with extraneous change" was largely the same as "without extraneous change". Anyway, it was found that the resonance frequency of the piezoelectric element changed with change in the environment where the ultrasonic sensor, in particular the piezoelectric element, was placed. In the present invention, the reverberation time RT is measured, and based on the measured time, the frequency of the burst signal generated in the burst signal circuit, that is, the burst wave frequency, can be adjusted. Thus, it is possible to generate and send a burst signal that suits the use environment of the ultrasonic sensor, and thus to provide an ultrasonic sensor that can suppress a drop in the S/N ratio.

The measurement accuracy of the reverberation time RT shown in FIG. 9 depends on the set value of the burst wave frequency fb along the horizontal axis, that is, the settings of the burst wave number, the first-time burst wave frequency, the burst wave frequency variation width, and the burst wave frequency variation number-of-times. These are set at steps 801 through 804 shown in FIG. 8.

INDUSTRIAL APPLICABILITY

As described above, an ultrasonic sensor and a method for controlling a burst signal according to the present invention are characterized by automatic adjustment of the burst wave frequency according to extraneous change. It is thus possible to suppress a drop in the transmission/reception sensitivity of the ultrasonic sensor and to enhance the accuracy of obstacle detection, promising extremely high industrial applicability.

LIST OF REFERENCE SIGNS 1 burst signal sending circuit
2 driver circuit
3 transmitter
4 piezoelectric element
4a transmission
5 receiver
5a reception
6 amplification circuit
7, 7A, 7B signal processing circuit
7b band-pass filter (BPF)
7c integrator
7d operation circuit
7f counter
7g register (assessment span set)
7h comparator
7i logic controller
7j reverberation frequency assessor
7k high-speed OSC
7L register (reverberation frequency assessment result hold)
7m comparator
7n register (comparison value)
7o counter (reverberation time measurement)
7p memory
7q operation processor
11 burst wave number set register
12 default burst wave frequency set register
13 burst transmission start register
14 first-time burst wave frequency set register
15 burst wave frequency variation width set register
16 burst wave frequency variation number-of-times set register
71 A/D converter
72 filter
73 assessor
74, 75 signal line
100, 100A, 100B transmission/reception processing circuit
1000, 1000A, 1000B ultrasonic sensor

The invention claimed is:

1. An ultrasonic sensor comprising:
a piezoelectric element for transmitting and receiving an ultrasonic signal, wherein the piezoelectric element has a reverberation frequency that is variable based on a variation in an environment of the ultrasonic sensor;
a transmitter configured to drive the piezoelectric element;
a burst signal sending circuit configured to deliver a burst signal of a burst wave frequency to the transmitter;
a receiver configured to accept a reception signal received by the piezoelectric element;
an amplification circuit configured to amplify the reception signal to output an amplified signal; and
a signal processing circuit configured to assess the amplified signal output from the amplification circuit,
wherein
the signal processing circuit is configured to assess the reverberation frequency of a reverberation signal contained in the amplified signal or a reverberation time that depends on a difference of the reverberation frequency from the burst wave frequency, and to feed a result of assessment back to the burst signal sending circuit, and
based on the result of assessment, the burst signal sending circuit is configured to adjust the burst wave frequency, wherein the burst signal sending circuit is configured to set the burst wave frequency, with the result of assessment reflected to follow variation of the reverberation frequency caused by the environment of the ultrasonic sensor.

2. The ultrasonic sensor of claim 1, wherein the burst signal sending circuit is configured to adjust the burst wave frequency to the reverberation frequency.

3. The ultrasonic sensor of claim 1, wherein the burst signal sending circuit includes:
a burst wave number set register in which a number of burst waves is determined;
a burst signal frequency set register in which the frequency of the burst signal is determined; and
a burst signal transmission start register which sends the burst signal.

4. The ultrasonic sensor of claim 3, wherein the burst signal sending circuit further includes:
a burst wave frequency variation width set register in which a width of steps in which the burst wave frequency is adjusted is stored; and
a burst wave frequency variation number-of-times register in which a number of steps in which the burst wave frequency is adjusted is stored.

5. The ultrasonic sensor of claim 2, wherein the signal processing circuit is configured to assess the reverberation frequency by counting a number of pulse signals occurring within predetermined periods of the reverberation signal.

6. The ultrasonic sensor of claim 1, wherein the signal processing circuit is configured to
convert an analog amplified signal extracted from an output of the amplification circuit into a digital signal with an A/D converter and
filter the digital signal through a band-pass filter, and includes an integrator configured to integrate the filtered signal.

7. The ultrasonic sensor of claim 6, wherein a band width of the band-pass filter is adjusted based on the result of assessment of the reverberation frequency.

8. The ultrasonic sensor of claim 1, wherein an output terminal of the transmitter, an input terminal of the receiver, and one terminal of the piezoelectric element are connected together.

9. The ultrasonic sensor of claim 8, wherein an ultrasonic signal occurring at the one terminal of the piezoelectric element is applied constantly to the amplification circuit via the receiver.

10. The ultrasonic sensor of claim 9, wherein a low-pass filter is coupled to the input terminal of the receiver, and through the low-pass filter, the output terminal of the transmitter and one terminal of the piezoelectric element are coupled to an input terminal of the amplification circuit.

11. The ultrasonic sensor of claim 10, wherein between the transmitter and the burst signal sending circuit, a driver circuit is provided, the driver circuit being configured to amplify the burst signal and drive the transmitter.

12. The ultrasonic sensor of claim 11, wherein the driver circuit or the transmitter includes a transformer for amplifying the burst signal.

13. The ultrasonic sensor of claim 1, wherein the burst signal sending circuit is configured to measure an integral time of an integral signal obtained by integrating the amplified signal and adjust the burst wave frequency based on the integral time.

14. The ultrasonic sensor of claim 13, wherein the reverberation time of the reverberation frequency is determined by counting a number of pulse signals occurring within predetermined periods of the integral signal.

15. The ultrasonic sensor of claim 14, wherein while the burst wave frequency is varied in a predetermined range, the number of pulse signals is sequentially counted and stored in a memory, and the frequency of the burst signal generated by the burst signal sending circuit is adjusted to the burst wave frequency that exhibits a largest number of pulse signals among those stored in the memory.

16. A method for controlling a burst signal of the ultrasonic sensor of claim 1, the method comprising:
setting a number of burst waves constituting the burst signal generated by the burst signal sending circuit;
setting an initial frequency of the burst waves;
starting and then ending application of the burst signal to the piezoelectric element;
starting circuit operation of a logic controller, which is part of the signal processing circuit, and starting assessment of the reverberation frequency;
comparing a count value obtained by counting periods of the burst signal with a previously set assessment span set value;
ending the circuit operation of the logic controller when the count value reaches the assessment span set value;
assessing the reverberation frequency in the signal processing circuit; and
feeding a result of assessment of the reverberation frequency back to the burst signal sending circuit and adjusting the burst wave frequency.

17. The method of claim 16, wherein after assessing the reverberation frequency, holding the result of assessment of the reverberation frequency is performed before adjusting the burst wave frequency.

18. A method for controlling a burst signal of the ultrasonic sensor of claim 1, the method comprising:
setting a number of burst waves constituting the burst signal generated by the burst signal sending circuit;
a first-time burst wave frequency setting step including setting a first-time frequency of the burst waves;
setting a variation width of the burst wave frequency;
setting a variation number-of-times of the burst wave frequency;
a burst signal transmission number-of-times resetting step including resetting a number of times of transmission of the burst signal to an object; and
comparing the burst signal transmission number-of-times with the set burst wave frequency variation number-of-times,
wherein until the burst signal transmission number-of-times reaches the burst wave frequency variation number-of-times,
transmitting the burst signal;
a burst signal transmission completing step including ending transmission of the burst signal;
measuring a time for which an ultrasonic signal reflected from the object reverberates;
comparing the reverberation time with a predetermined value in the assessor;
stopping measurement of the reverberation time when the reverberation time reaches the predetermined value;
holding the measured reverberation time; and
adjusting the burst wave frequency according to the held reverberation time are performed repeatedly.

19. The method of claim 18, further comprising:
calculating the reverberation time when the burst signal transmission number-of-times reaches the burst wave frequency variation number-of-times;
holding a result of assessment of a reverberation frequency determined based on the reverberation time; and
adjusting the burst wave frequency of the burst signal based on the result of assessment of the reverberation frequency.

* * * * *